(12) United States Patent
Fiumefreddo et al.

(10) Patent No.: US 9,586,608 B2
(45) Date of Patent: Mar. 7, 2017

(54) STEERING WHEEL COVER HAVING CLIPS

(71) Applicant: Kraco Enterprises, LLC., Compton, CA (US)

(72) Inventors: John J. Fiumefreddo, Huntington Beach, CA (US); Alexandria R. Hill, Redondo Beach, CA (US); Kenneth A. Gross, Northridge, CA (US); Craig A. White, Los Angeles, CA (US)

(73) Assignee: Kraco Enterprises, LLC., Compton, CA (US)

( * ) Notice: Subject to any disclaimer, the term of this patent is extended or adjusted under 35 U.S.C. 154(b) by 0 days.

(21) Appl. No.: 14/830,265

(22) Filed: Aug. 19, 2015

(65) Prior Publication Data

US 2016/0107674 A1 Apr. 21, 2016

Related U.S. Application Data

(60) Provisional application No. 62/065,958, filed on Oct. 20, 2014.

(51) Int. Cl.
*B62D 1/06* (2006.01)

(52) U.S. Cl.
CPC ...................... *B62D 1/06* (2013.01)

(58) Field of Classification Search
CPC .................................. B62D 1/06; B62D 1/11
USPC ........................................................ 74/558
See application file for complete search history.

(56) References Cited

U.S. PATENT DOCUMENTS

| | | | | |
|---|---|---|---|---|
| 1,876,993 A * | 9/1932 | Manning | .................. | B62D 1/06 |
| | | | | 16/DIG. 12 |
| 4,251,889 A * | 2/1981 | Lof | .......................... | E04H 4/10 |
| | | | | 4/498 |
| 4,549,069 A * | 10/1985 | Oge | ........................ | B62D 1/065 |
| | | | | 219/204 |
| 5,224,397 A * | 7/1993 | Yoo | .......................... | A61N 1/10 |
| | | | | 74/552 |
| 5,848,559 A * | 12/1998 | Harrill | .............. | A61H 23/0254 |
| | | | | 74/558 |
| 2002/0029650 A1* | 3/2002 | Emeneth | .................. | B62D 1/06 |
| | | | | 74/552 |
| 2011/0219910 A1* | 9/2011 | Wu | ......................... | B62D 1/06 |
| | | | | 74/558 |

FOREIGN PATENT DOCUMENTS

| | | | | | |
|---|---|---|---|---|---|
| CH | 233336 | A * | 7/1944 | .............. | B62J 23/00 |
| DE | 19539847 | C1 * | 1/1997 | .............. | B60K 20/06 |
| FR | 1089449 | A * | 3/1955 | .............. | B62D 1/06 |
| FR | 1401806 | A * | 6/1965 | .............. | B62D 1/06 |
| GB | 516269 | A * | 12/1939 | .............. | B62D 1/06 |
| GB | 689548 | A * | 4/1953 | .............. | B62D 1/06 |

OTHER PUBLICATIONS

Translation fo CH233336.*

* cited by examiner

*Primary Examiner* — Vicky Johnson
(74) *Attorney, Agent, or Firm* — Wood Herron & Evans LLP

(57) ABSTRACT

A cover for a steering wheel of an automobile includes at least one fastening member that has a plurality of resilient, generally C-shaped clips that are spaced apart to define an outer periphery. Each clip includes a base portion and first and second oppositely disposed arms. The clips are configured to be received over the rim of a steering wheel, whereby the cover may be selectively attached to and removed from the steering wheel.

18 Claims, 23 Drawing Sheets

STEERING WHEEL COVER HAVING CLIPS

CROSS-REFERENCE

This application claims the benefit of U.S. Provisional Patent Application Ser. No. 62/065,958, filed Oct. 20, 2014, the disclosures of which is expressly incorporated by reference herein in their entirety.

TECHNICAL FIELD

The present invention relates to automotive accessories and, more particularly, to a steering wheel cover for providing an improved, more uniform fit over a steering wheel.

BACKGROUND

Steering wheels are used in motor vehicles and are commonly formed in the shape of a circular ring or rim supported by a hub attached to a steering shaft. While there have been many improvements to the construction of steering wheels, many drivers prefer to add a steering wheel cover to improve comfort and aesthetic appearance of steering wheels. For example, the circular ring or rim of steering wheels, being gripped by a driver's hands is subjected to considerable wear and accumulated dirt and debris as the vehicle is used. Steering wheel covers are commonly used to mitigate many of such problems, as well as to improve the aesthetic appearance of the wheel. Many drivers of cars and other motor vehicles purchase steering wheel covers made from vinyl, textile, or other materials, to enhance grip or comfort, or simply as decoration. Typically, a steering wheel cover must be stretched or otherwise fitted over a rim of a steering wheel to affix the steering wheel cover thereto. Conventional designs generally comprise a rubber core wrapped in upholstery such as fabric, leather, and/or vinyl. These types of steering wheel covers are oftentimes stiff and difficult to install, and frequently do not tend to fit well on many common steering wheel configurations because of variations in steering wheel diameters, even though many such steering wheel covers are described as being one-size-fits-all. For example, the upholstery of conventional steering wheel covers may pucker or scrunch during installation, or even during use, presenting an unattractive appearance and causing frustration and discomfort for a user. In addition, many conventional steering wheel covers are stiff and require considerable stretching force to be placed around the steering wheel rim. Again, the installation of this type of cover is not particularly user friendly. Further, the rubber core, in its stretched state, is subjected to considerable tensile force resulting in the tendency of the cover to break over time. From a marketing perspective, many conventional steering wheel covers are non-collapsible, such that they may only be packaged or displayed in a fully expanded state. As a result, these conventional steering wheel covers occupy an unnecessarily large amount of shelf space at a point of sale.

A need exists for a steering wheel cover that overcomes the drawbacks of conventional steering wheel covers disclosed above.

DETAILED DESCRIPTION

Figure 1:
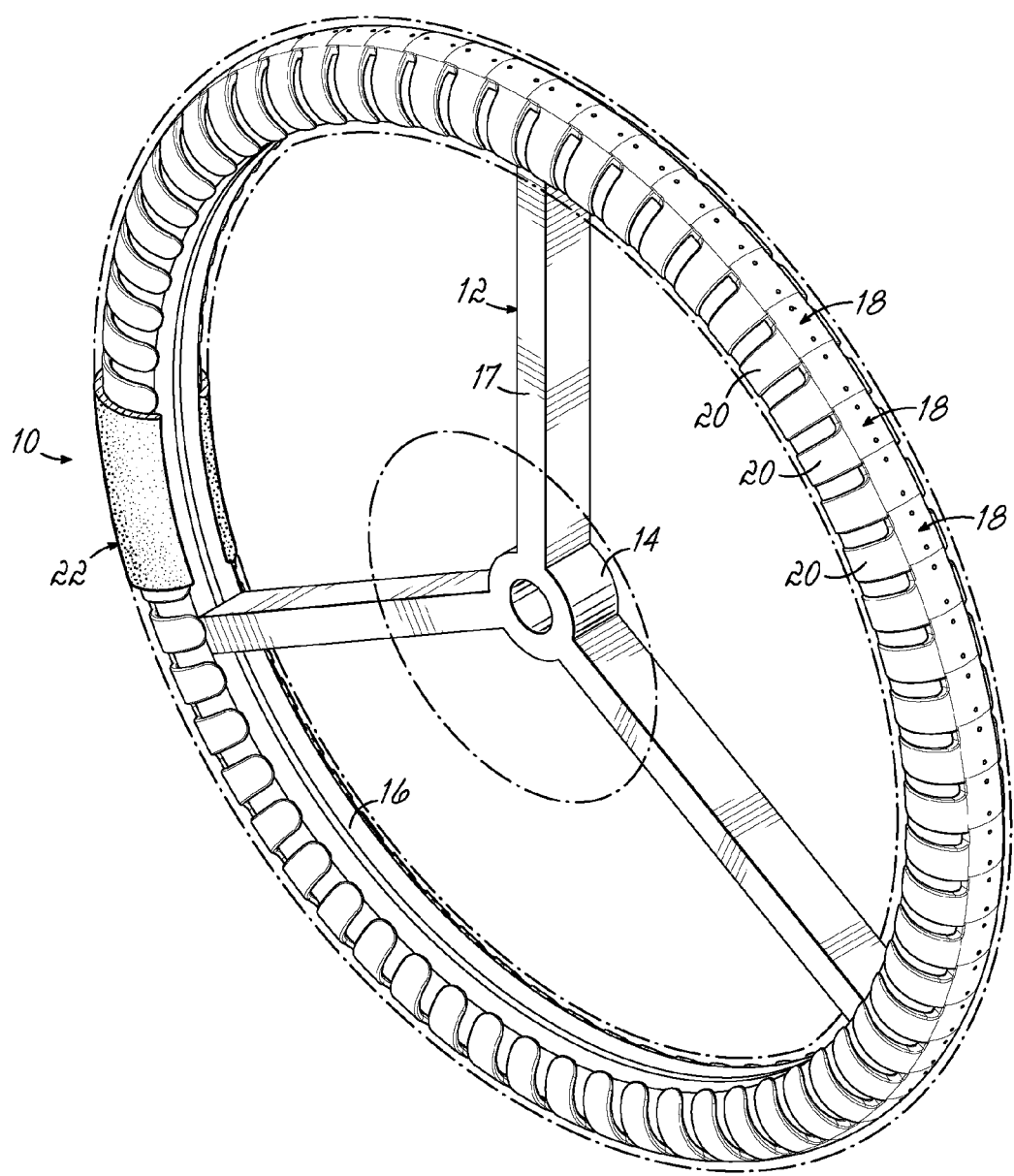
FIG. 1 is a perspective view of an exemplary steering wheel cover installed over a steering wheel, in accordance with the principles of the present invention.
Figure 2:
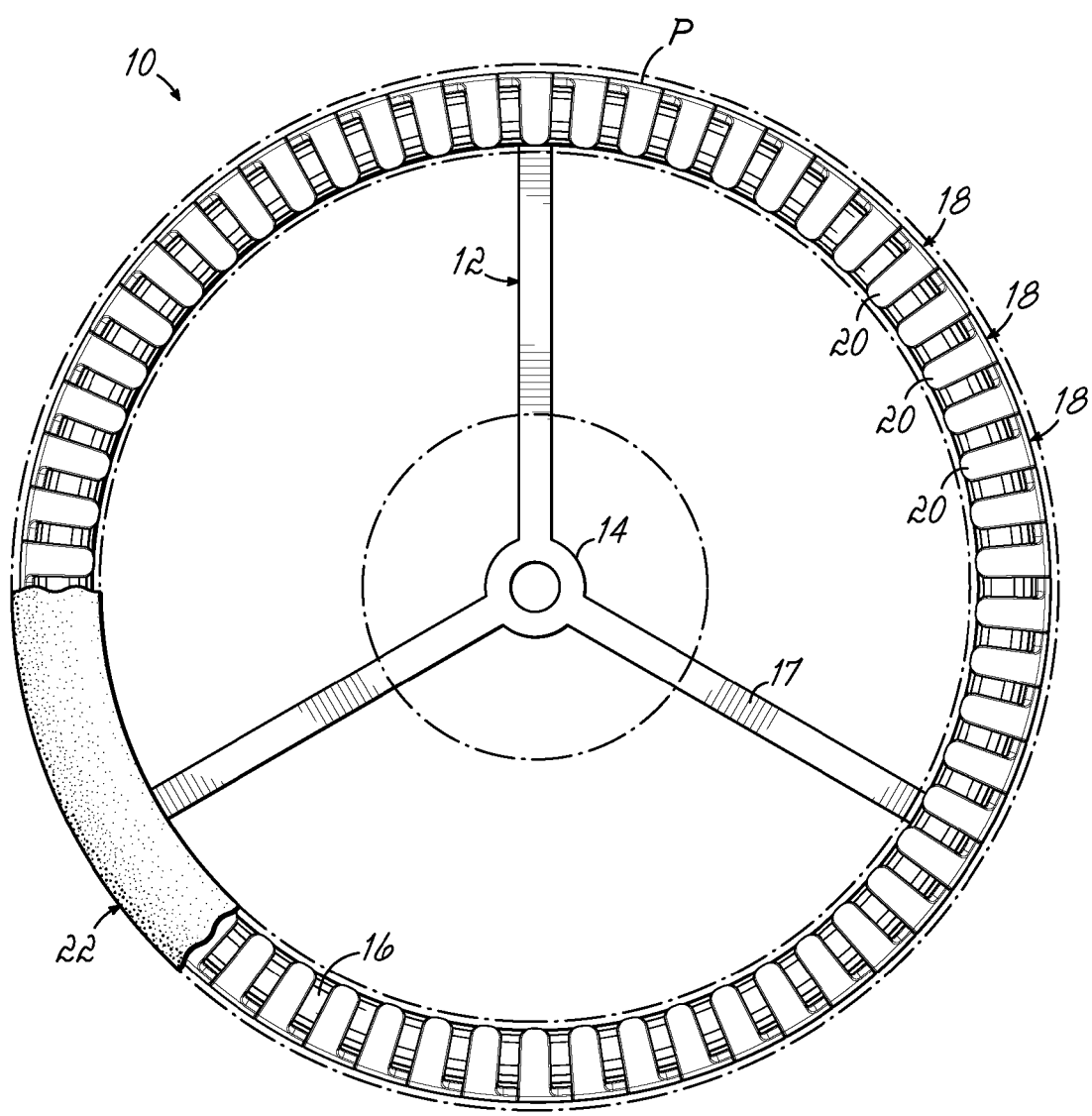
FIG. 2 is a front view of the exemplary steering wheel cover of FIG. 1, installed over a steering wheel.
Figure 3:
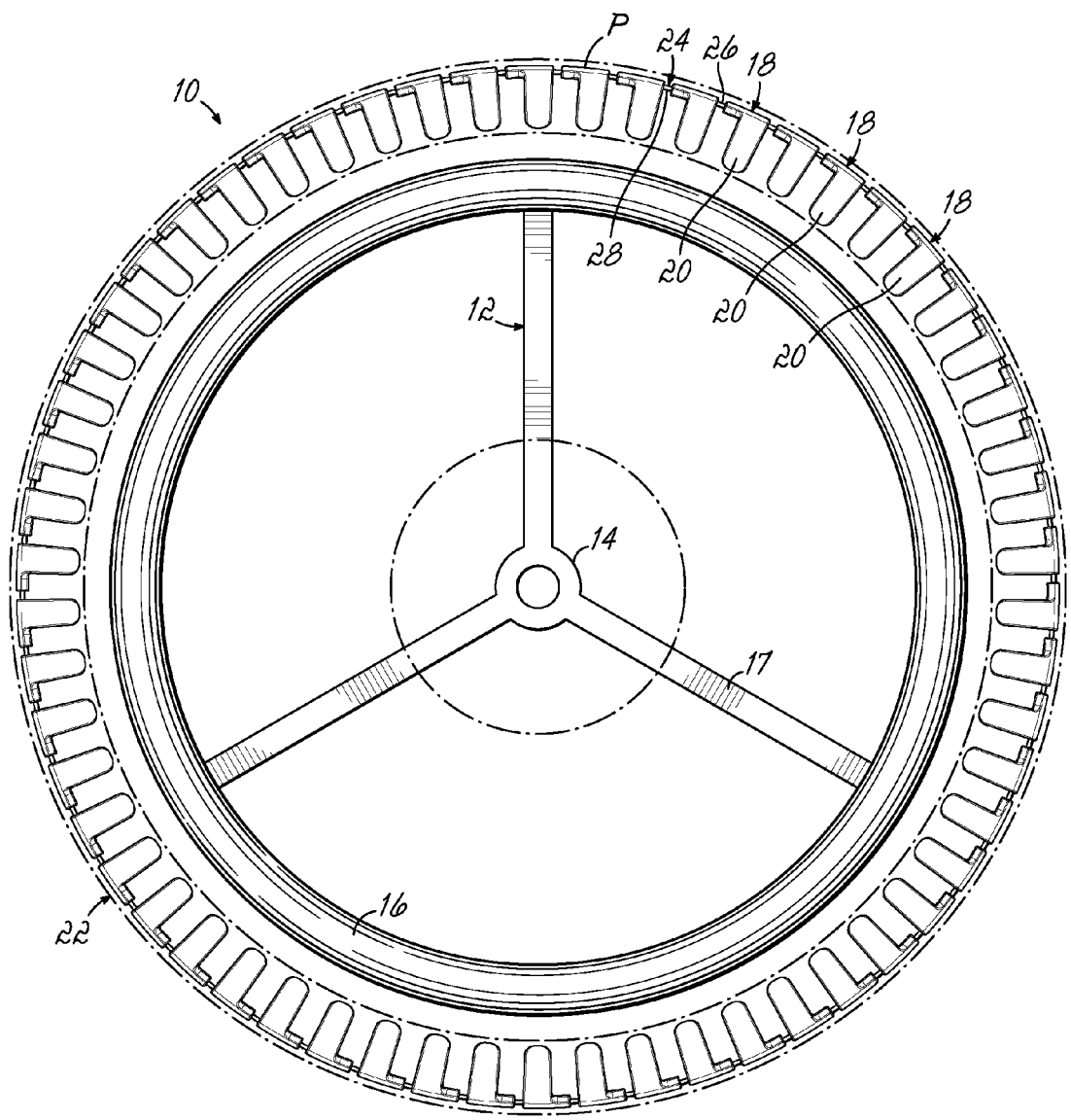
FIG. 3 is a front view of the exemplary steering wheel cover of FIG. 1, illustrating installation over a steering wheel.
Figure 4:
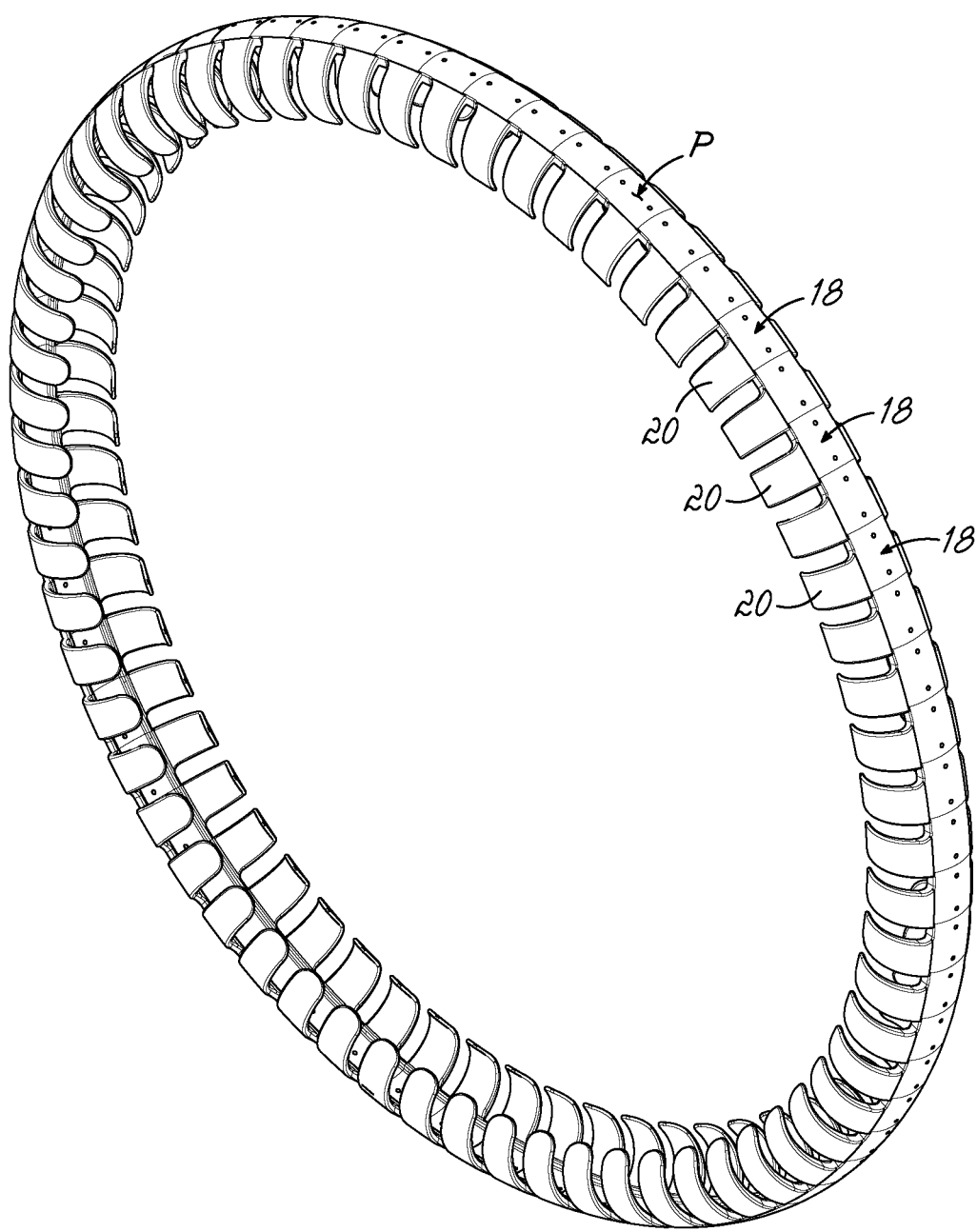
FIG. 4 is a perspective view of the fastening members of the exemplary steering wheel cover of FIG. 1.

Referring now to FIGS. 1-4, an exemplary embodiment of a steering wheel cover 10 in accordance with the principles of the present invention is shown. The steering wheel cover 10 may be used with a steering wheel 12 having a hub 14 and a rim 16 coupled to the rim by radially extending arms 17. The steering wheel cover 10 may include a plurality of fastening members 18, each including a resilient and generally C-shaped clip 20. The fastening member 18 may be spaced and arranged to define an outer periphery P. For example, the fastening members 18 may be spaced and arranged to define a circular periphery P, as best shown in FIG. 4, and which may generally correspond to the rim 16. In this manner, the clips 20 may be configured to be received over the rim 16. The steering wheel cover 10 may further include a cover material 22 disposed around the fastening members 18. The cover material 22 may provide improved comfort and grip to a user, and may also provide an aesthetically pleasing appearance. In addition, the cover material 22 may maintain a desired spacing between the fastening members 18. In one embodiment, the cover material 22 may comprise a fabric. However, in other embodiments, other materials may be used that are suitable for retaining the fastening members 18, providing improved grip or comfort, or providing an aesthetically pleasing appearance, such as leather, or a plastic or rubber material, for example.

With specific reference now to FIG. 3, the exemplary steering wheel cover 10 may be radially expanded by a user in order to position the steering wheel cover 10 over the rim 16. For example, the steering wheel cover 10 may include a band 24 which may be elastomeric and may have a generally annular shape and radially inwardly and outwardly facing surfaces 26, 28. The fastening members 18 may be attached to the band 24. For example, the fastening members 18 may be attached to the radially outwardly facing surface 28 of the band 24. As the band 24 is stretched, the spacing between the fastening members 18, and consequently, the spacing between the clips 20, increases such that the outer periphery P radially expands. The steering wheel cover 10 may then be positioned around the rim 16 of the steering wheel 12. Subsequently, as the band 24 is released, the spacing between the fastening members 18 decreases and the outer periphery P radially contracts until the clips 20 are received over, and engage, the rim 16 (FIG. 2). For display purposes, for example on a shelf at a point of sale, the steering wheel cover 10 may be easily manipulated to assume other shapes suitable for packaging and display due to the elasticity of the band 24 and the configuration of the fastening members 18. However, in other embodiments, the band 24 may be substantially rigid and may have a generally linear shape, such that a user may bend the band 24 around the steering wheel rim 16 (not shown).

Figure 5:
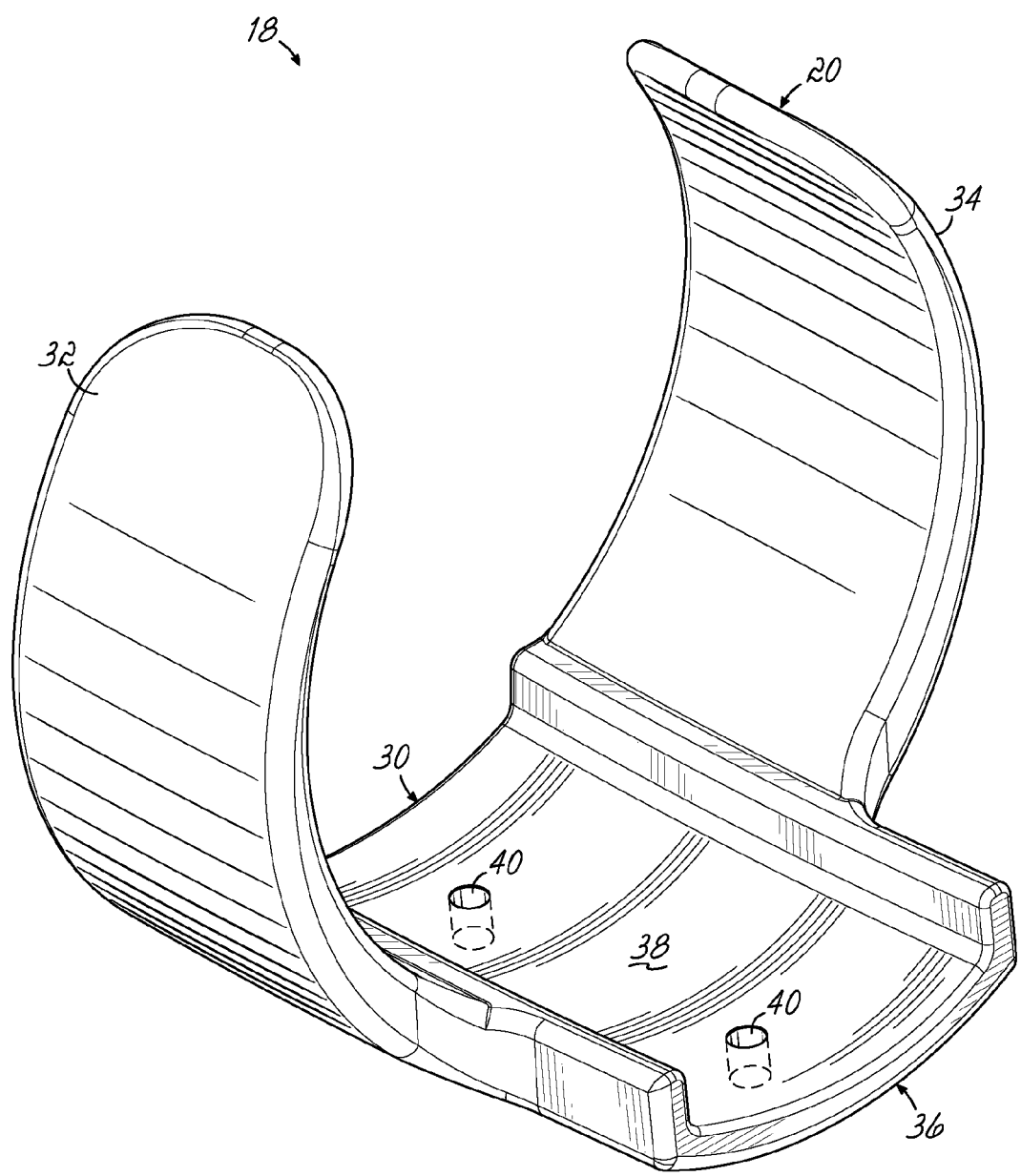
FIG. 5 is a perspective view of a single fastening member of FIG. 4.

Referring now to FIG. 5, with continued reference to FIGS. 1-4, the fastening members 18 may each include a clip 20 having a clip base portion 30 and first and second oppositely disposed arms 32, 34. The fastening members 18 may each further include a spacer portion 36 for providing a desired spacing between adjacent clips 20. The clip 20 and spacer portion 36 may each be integrally formed with the fastening member 18. Moreover, the spacer portion 36 may define a portion of the outer periphery P. In the embodiment shown, the clip base portion 30 and spacer portion 36 define a channel 38 for receiving a segment of the band 24. In other embodiments, only one of the clip base portion 30 or spacer portion 36 may define a channel for receiving a segment of the band 24. For example, the fastening member 18 may not include a spacer portion 36, such that the clip base portion 30 alone may define the channel 38. Various other embodiments may not include a channel. At least one of the clip base portion 30 or the spacer portion 36 may also include holes 40 for facilitating attachment of the band 24 to the fastening member 18, such as by rivets, staples, or any other suitable fastening structure. The first and second oppositely disposed arms 32, 34 may comprise a semi-flexible or semi-resilient material in order to provide a snap-fit over the rim 16 of the steering wheel 12. For example, the first and second oppositely disposed arms 32, 34 may comprise a polymeric material. It will be appreciated, however, that various other materials may be used that are suitable for facilitating securing the fastening members 18 to the rim 16 of a steering wheel 12.

Figure 6:
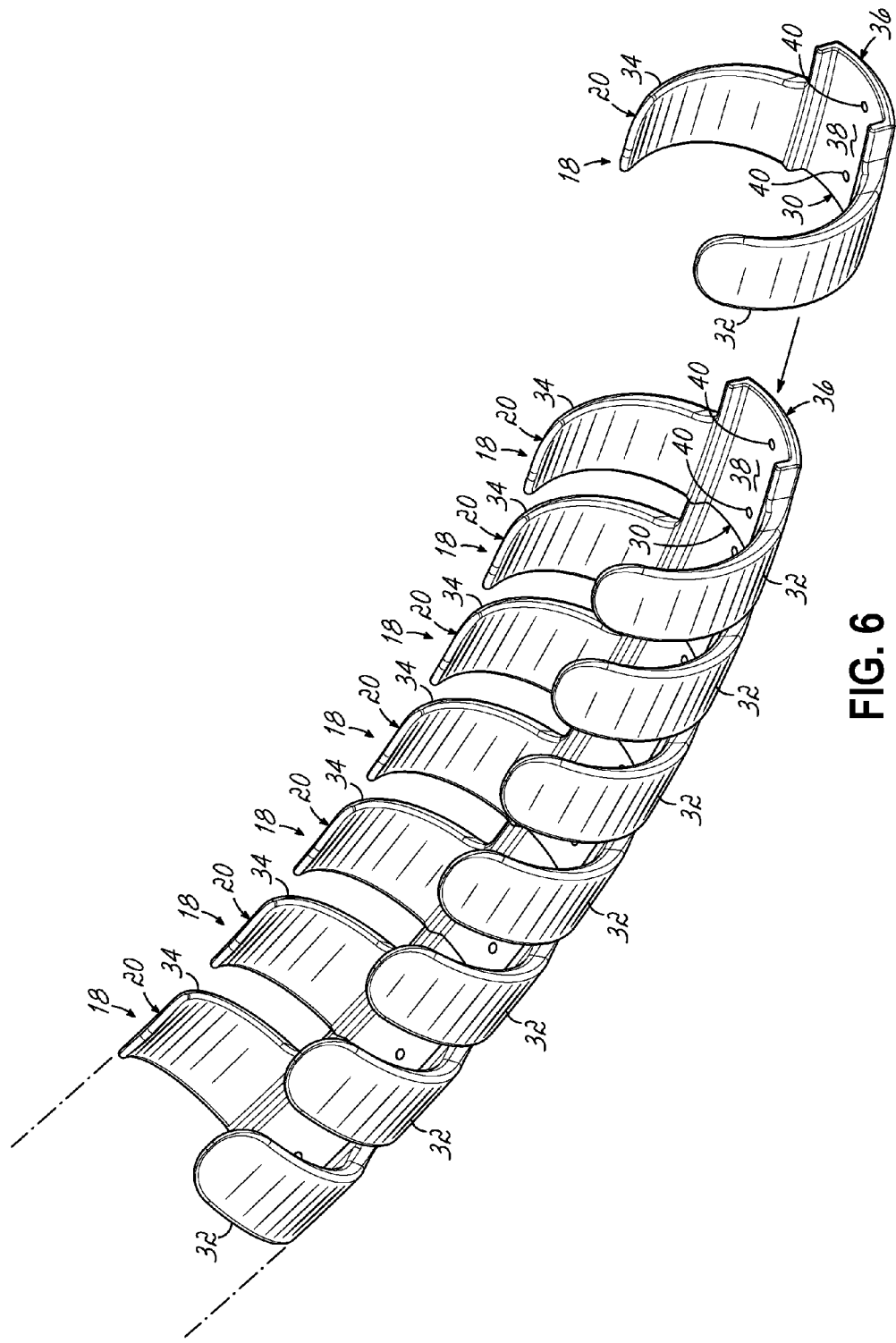
FIG. 6 is a perspective view of a portion of the fastening members of FIG. 4.

Referring now to FIG. 6, and with continued reference to FIGS. 1-5, a plurality of fastening members 18 may be provided, each defining a clip 20 that is spaced apart from adjacent clips 20 to define an outer periphery P. For example, the fastening members 18 may be arranged in an end-to-end configuration. In the embodiment shown, a portion of each fastening member 18 may substantially abut a portion of an adjacent fastening member 18. For example, the clip base portion 30 of one fastening member 18 may abut the spacer portion 36 of an adjacent fastening member 18. In other embodiments, the clips 20 may be arranged in various other configurations to define an outer periphery P. For example, the fastening members 18 may alternatively not include spacer portions 36. In another alternative embodiment, the clips 20 may be arranged such that a portion of each fastening member 18 may not substantially abut a portion of an adjacent fastening member 18 to space the clips 20 apart.

Figure 4A:
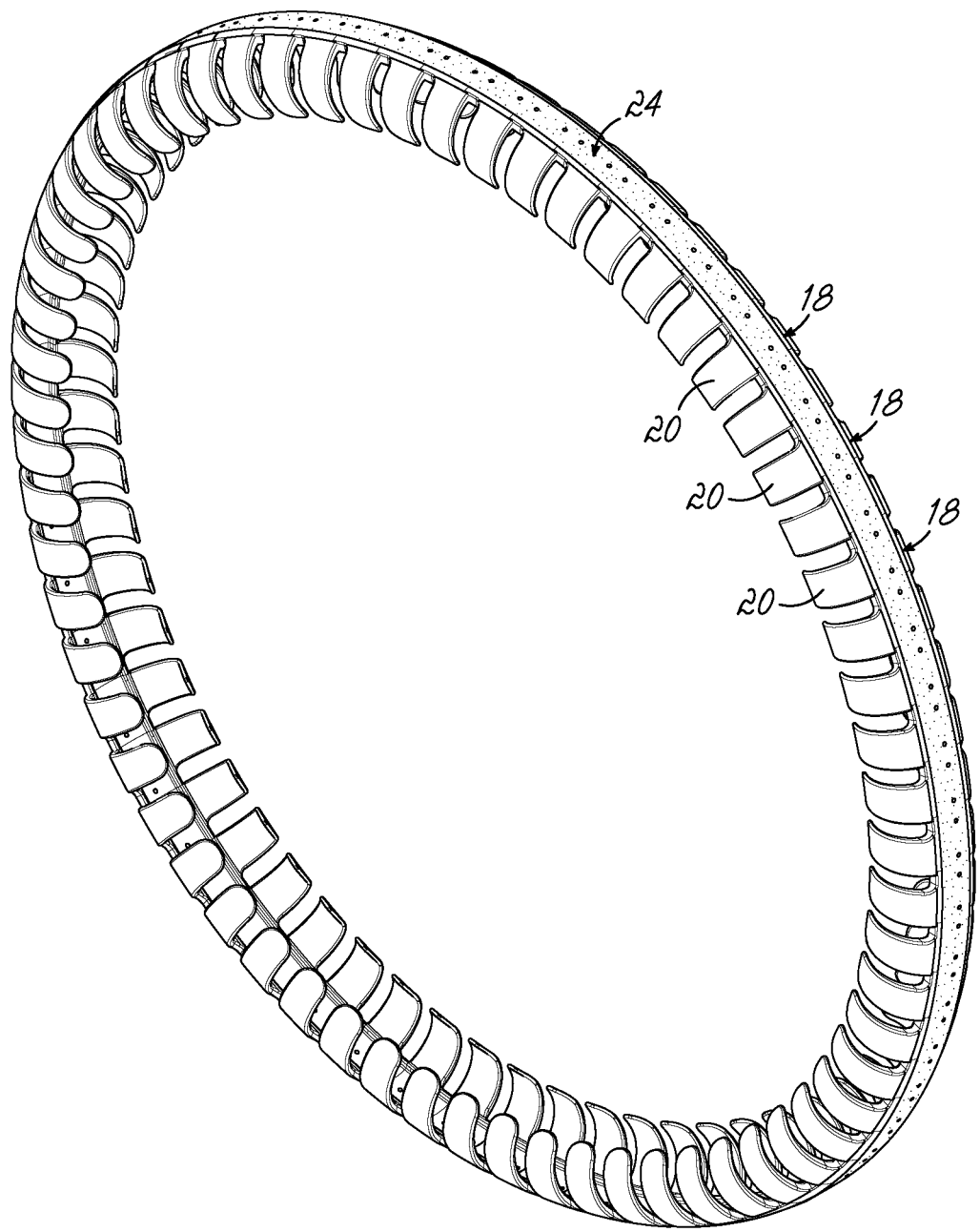
FIG. 4A is a perspective view similar to FIG. 4, depicting a band positioned outside the fastening members.
Figure 7:
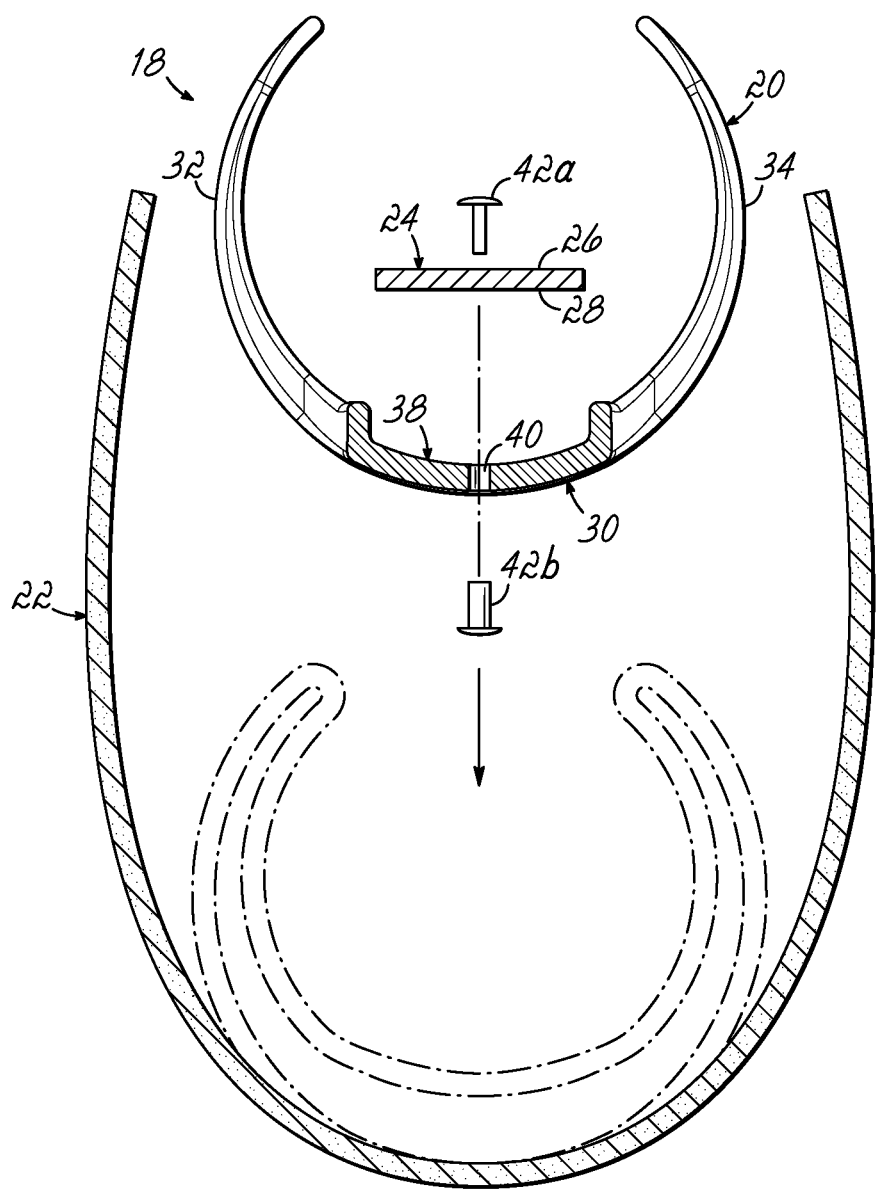
FIG. 7 is an exploded cross-sectional view of the exemplary steering wheel cover of FIG. 1.
Figure 8:
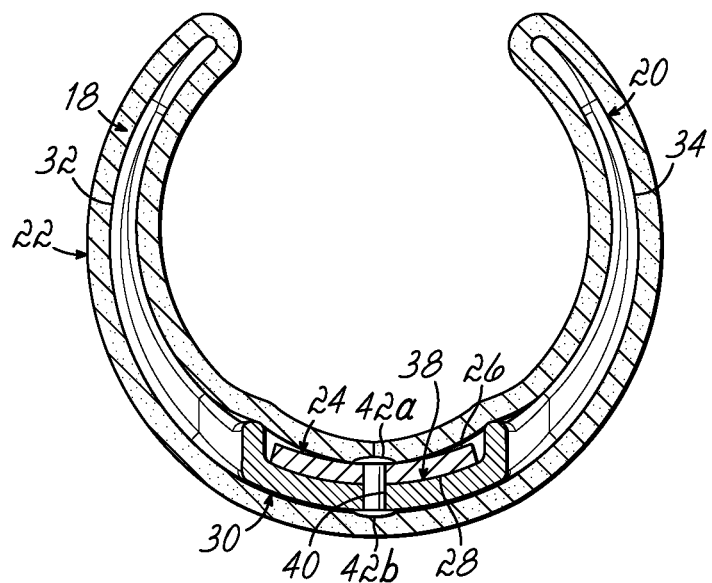
FIG. 8 is a cross-sectional view of the exemplary steering wheel cover of FIG. 1.
Figure 8A:
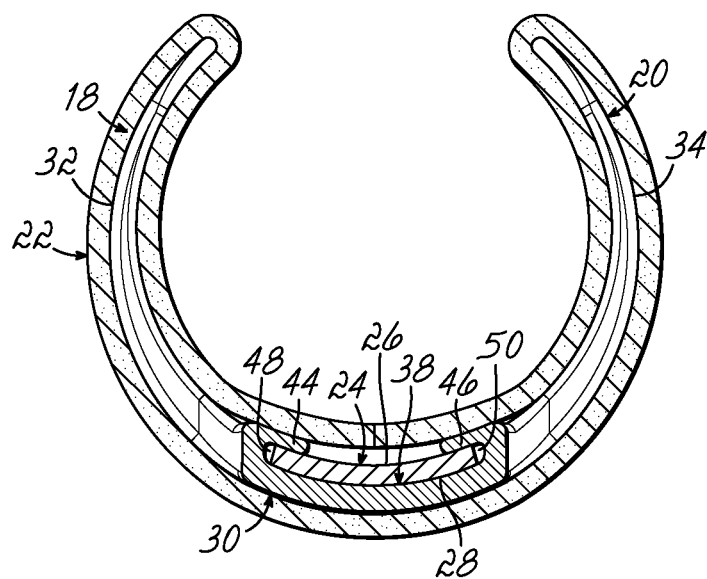
FIG. 8A is a cross-sectional view of an alternative steering wheel cover, in accordance with the principles of the present invention.

Referring now to FIGS. 7 and 8, and with continued reference to FIGS. 1-6, in one embodiment a fastening member 18 may be attached to the radially outwardly facing surface 28 of a band 24. In such an embodiment, the band 24 will be disposed between the steering wheel rim 16 and the clips 20 in an installed condition, and may provide improved grip between the steering wheel cover 10 and the rim 16. As previously described with reference to FIG. 5, the fastening member 18 may include a channel 38 for receiving a portion of the band 24. A portion of the band 24 may be positioned within the channel 38 and attached thereto, such as by rivets 42a, 42b inserted through the holes 40, for example, such that the radially outwardly facing surface 28 of the band 24 is securely attached to the fastening member 18. Other suitable means for attaching the band 24 to the fastening member 18 may alternatively be used, such as glue, staples, stitching, or any other suitable method. Alternatively, in one alternative embodiment the fastening member 18 may be integrally formed with the band 24. In another alternative embodiment, the fastening member 18 may be overmolded on the band 24. Alternatively, the band 24 may be mechanically attached to the fastening member 18. For example, the fastening member 18 may include fingers 44, 46, as shown in FIG. 8A, or other edges providing grooves 48, 50 proximal to the sides of the channel 38, such that portions of the band 24 may be retained within the grooves 48, 50. In other embodiments, a fastening member 18 may be attached to the radially inwardly facing surface 26 of a band 24, such that the band 24 is positioned radially outwardly of the plurality of clips 20, as shown in FIG. 4A.

An exemplary steering wheel cover 10 in accordance with the principles of the present invention may further include a cover material 22 disposed around at least a portion of one or more fastening members 18. For example, fabric or any other suitable material may be wrapped around the fastening members 18 and stitched or otherwise secured thereover. In one embodiment, the fastening members 18 may be coupled with the cover material 22 such that the cover material 22 maintains a spacing between the clips 20. Alternatively, a cover material 22 may be disposed around only a portion of a fastening member 18, or a cover material 22 may not be provided and the fastening member 18 may be exposed on a steering wheel 12 in an installed condition to improve grip and provide an aesthetically pleasing appearance.

Figure 9:
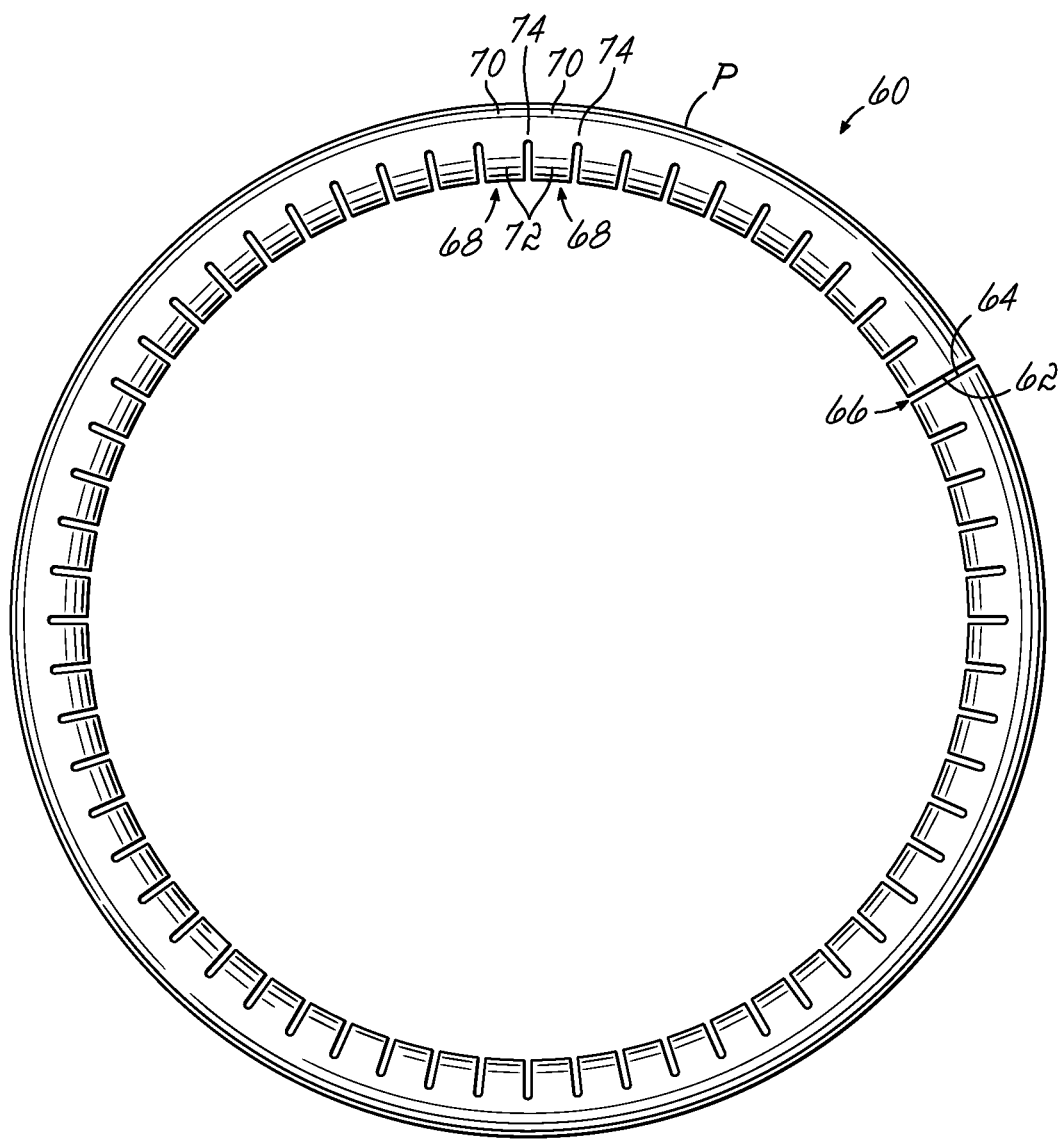
FIG. 9 is a front view of another embodiment of an exemplary fastening member of a steering wheel cover, in accordance with the principles of the present invention.
Figure 10:
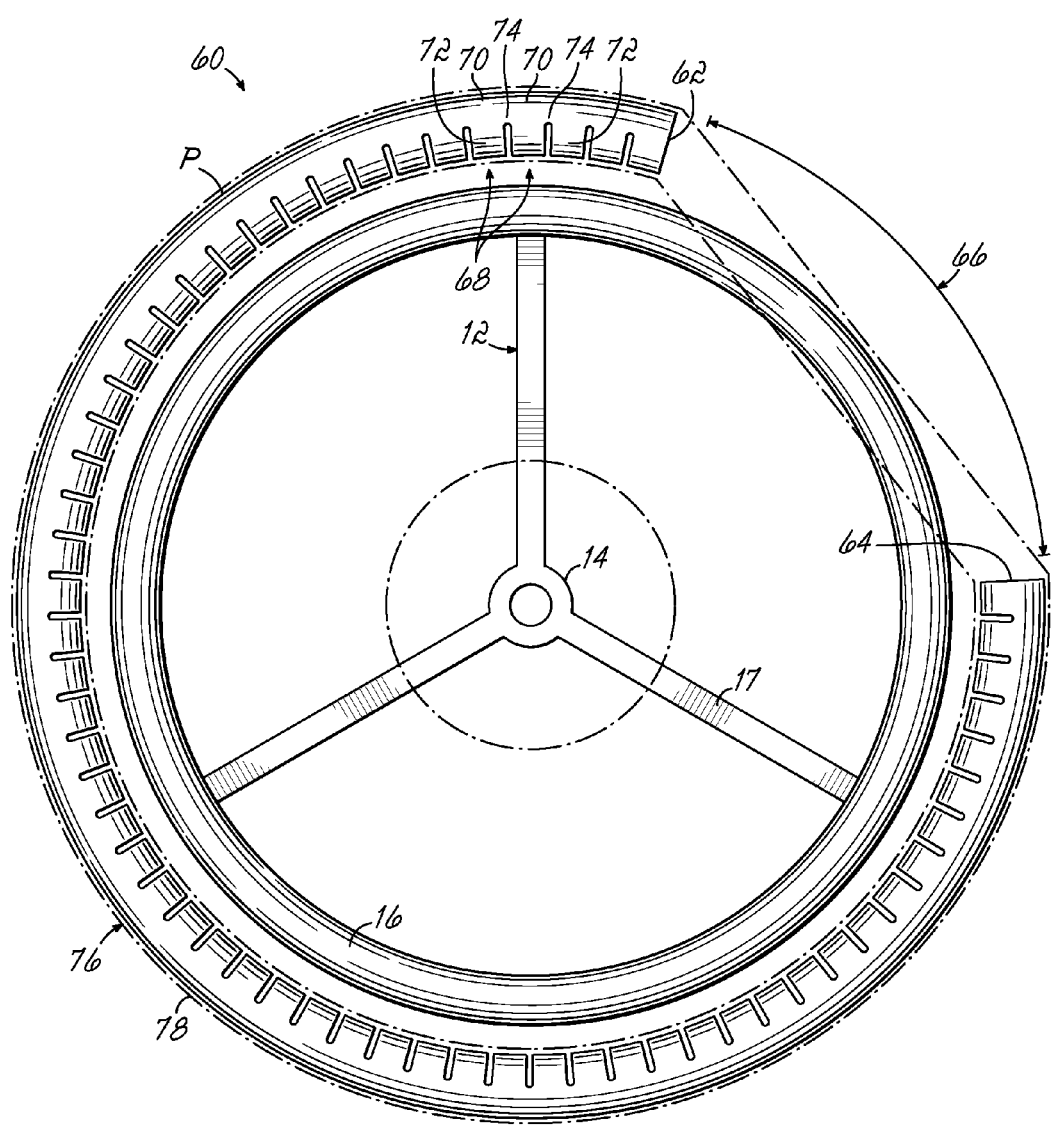
FIG. 10 is a front view of an exemplary steering wheel cover including the fastening member of FIG. 9, illustrating installation over a steering wheel.
Figure 11:
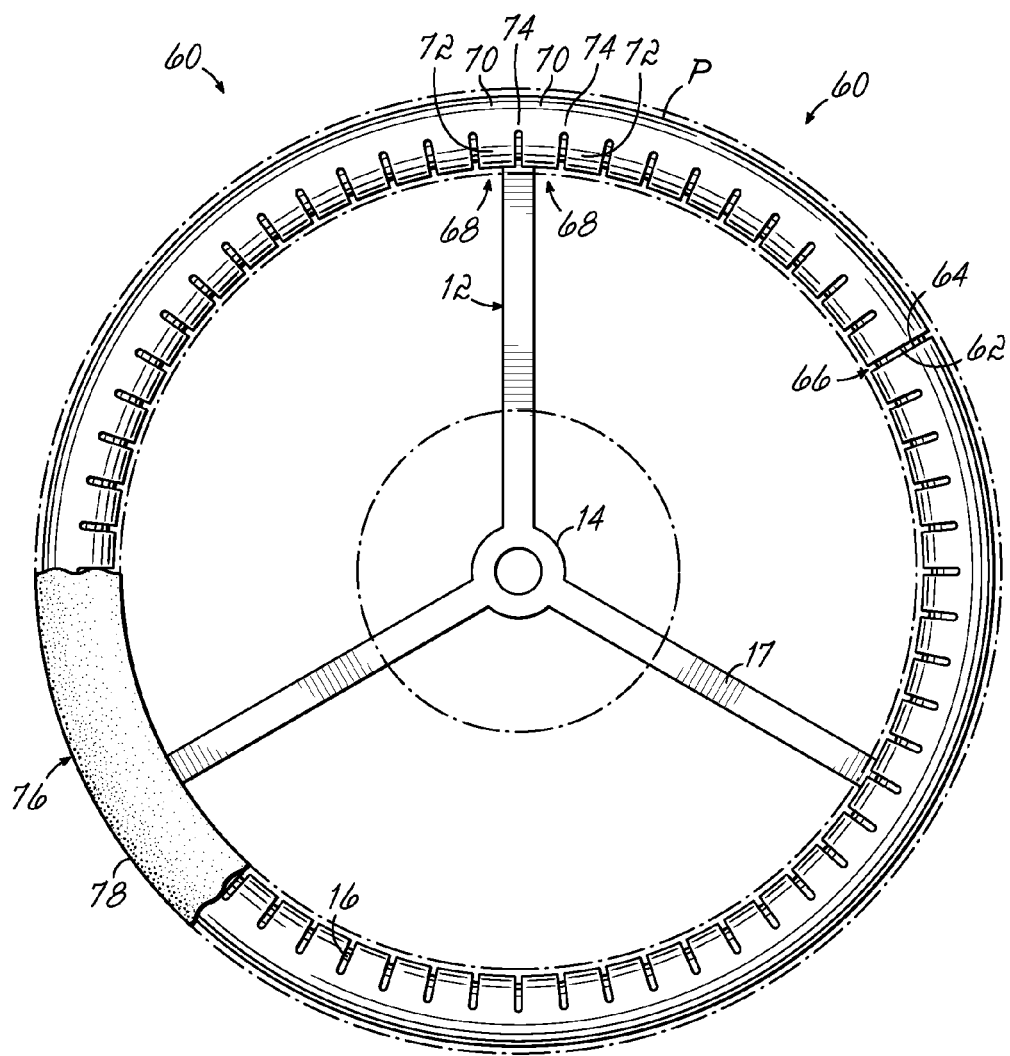
FIG. 11 is a front view of the exemplary steering wheel cover of FIG. 10, installed over a steering wheel.

Referring now to FIGS. 9-13, another exemplary embodiment of a fastening member 60 for a steering wheel cover in accordance with the principles of the present invention is shown. With specific reference to FIG. 9, the fastening member 60 may be constructed of a semi-flexible or semi-resilient material, such as a plastic, for example, and may include first and second terminal ends 62, 64 defining a gap 66 that accommodates differently sized steering wheels in an installed condition (FIG. 11). In one embodiment, the first and second terminal ends 62, 64 of the fastening member 60 may be elastically coupled to one another, in order to bias the first and second terminal ends 62, 64 toward each other. For example, the first and second terminal ends 62, 64 may be coupled to one another by means of an elastic band (not shown).

Figure 13:
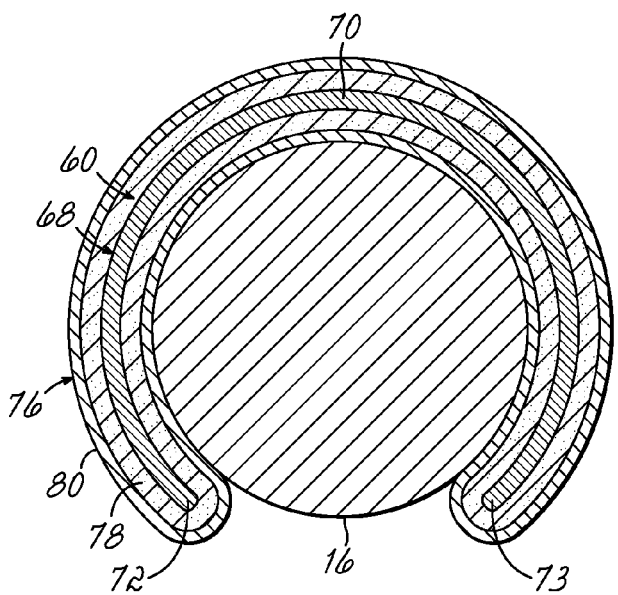
FIG. 13 is a cross-sectional view of the exemplary steering wheel cover of FIG. 12, taken along section line 13-13.

The fastening member 60 may include a plurality of integrally formed clips 68, each having a clip base portion 70 and first and second oppositely disposed arms 72, 73 (FIG. 13). The first and second oppositely disposed arms 72, 73 may comprise a semi-flexible or semi-resilient material in order to provide a snap-fit over a rim of a steering wheel. For example, the first and second oppositely disposed arms 72, 73 may comprise a polymeric material. It will be appreciated, however, that various other materials may be used that are suitable for facilitating securing the fastening member 60 to a rim of a steering wheel. Moreover, the fastening member 60 may further include spacer portions 74 positioned between adjacent clips 68 in order to provide a spaced apart relationship between the clips 68 and to define an outer periphery P. For example, the clips 68 may be spaced apart to define a circular periphery P, as shown, and which may generally correspond to a steering wheel rim.

With specific reference now to FIGS. 10 and 11, a steering wheel cover 76 including a cover material 78 and the fastening member 60 depicted in FIG. 9 may be manipulated by a user in order to position the steering wheel cover 76 over a steering wheel rim 16. For example, the first and second terminal ends 62, 64 of the fastening member 60 may be manipulated away from each other. As the first and second terminal ends 62, 64 move away from each other, the cover material 78 may be stretched freely and the gap 66 may expand such that outer periphery P may be partially expanded. The steering wheel cover 76 may then be positioned around the rim 16 of the steering wheel 12 (FIG. 10). Subsequently, as the first and second terminal ends 62, 64 retract toward each other, the cover material 78 and the gap 66 may contract such that the outer periphery P contracts until the clips 68 are received over, and engage, the rim 16 (FIG. 11). In one embodiment, the cover material 78 may comprise an elastic material, such that the cover material 78 may facilitate the retraction of the first and second terminal ends 62, 64 toward each other. Alternatively, a cover material may not be disposed around the fastening member 60, or may be partially disposed over the fastening member 60 such that the cover material may not interfere with, or otherwise substantially affect, the manipulation of the fastening member 60.

Figure 12:
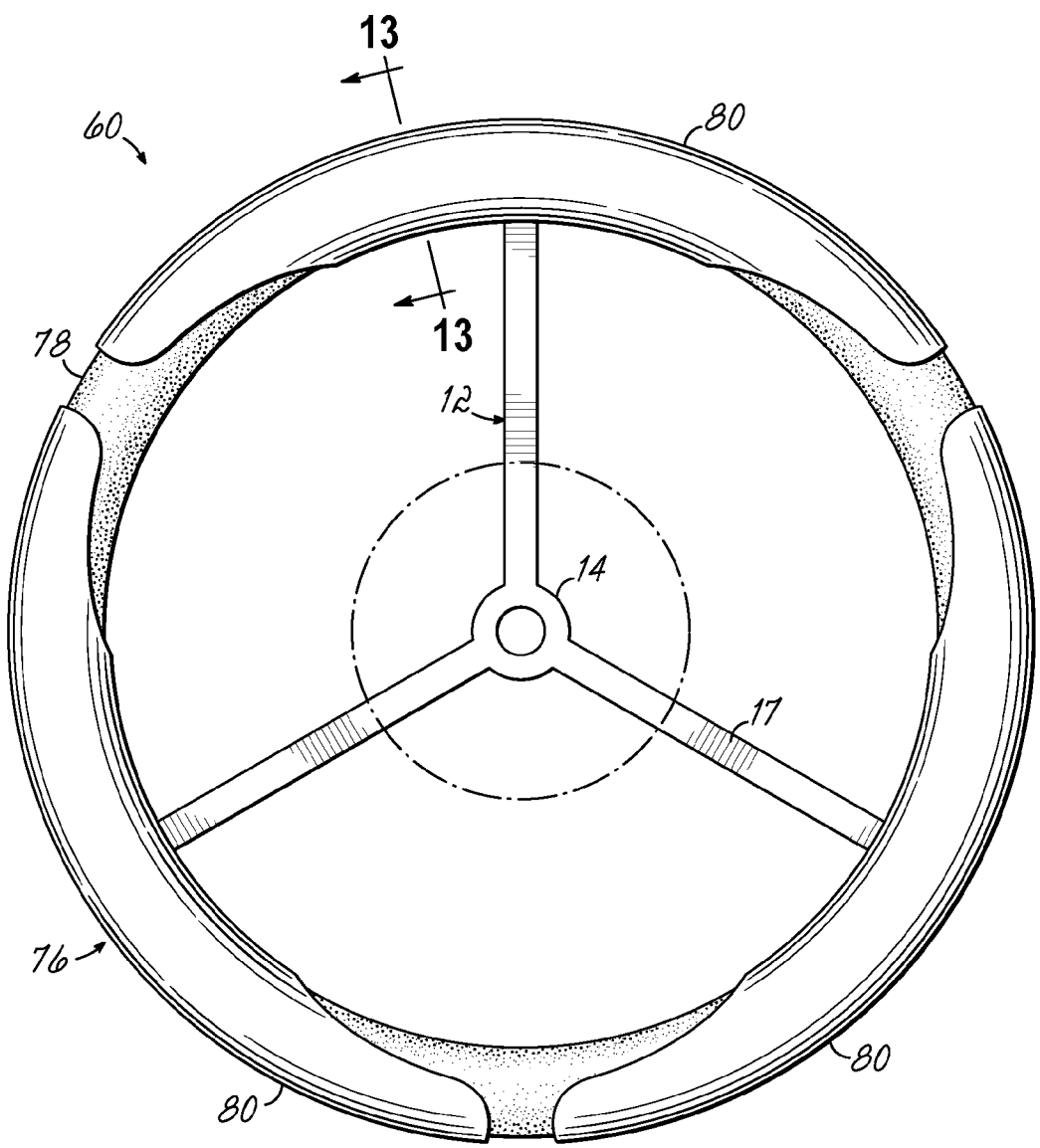
FIG. 12 is a front view of another embodiment of an exemplary steering wheel cover installed over a steering wheel, in accordance with the principles of the present invention.

As shown in FIGS. 12 and 13, in one embodiment a steering wheel cover 76 in accordance with the principles of the present invention may further include at least one secondary cover material 80 disposed around at least a portion of the steering wheel cover 76. For example, the secondary cover material 80 may be stitched, formed, adhered, or otherwise secured over the cover material 78. The secondary cover material 80 may provide improved comfort, grip, or aesthetic appearance, and may comprise a fabric, rubber, plastic, or any other suitable material. As shown in FIG. 12, the secondary cover material 80 may be disposed over only selected portions of the steering wheel cover 76. However, in other embodiments the secondary cover material 80 may be disposed over any desired portion, or portions, of the steering wheel cover 76, or may be disposed over the entire steering wheel cover 76.

Figure 14:
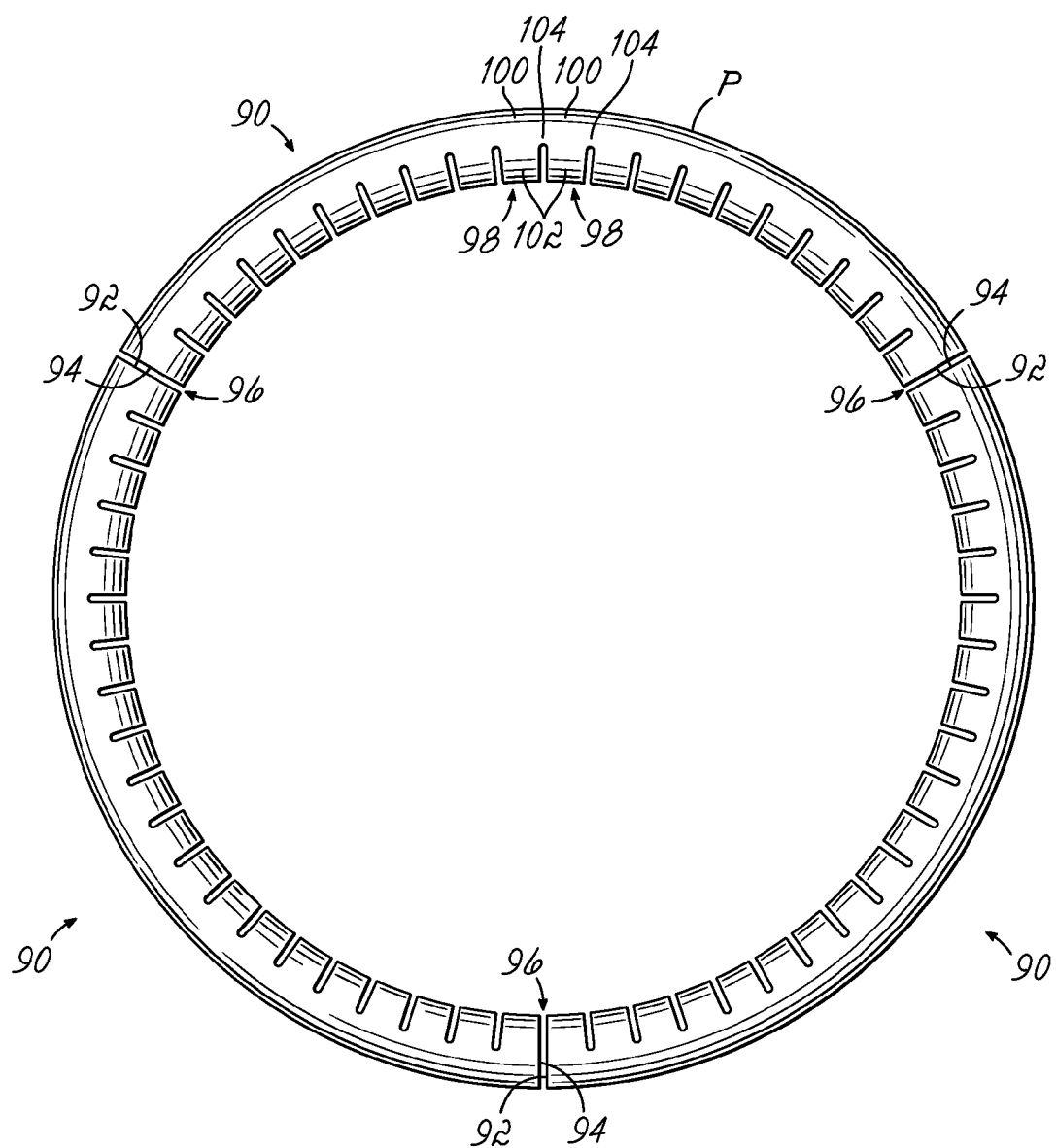
FIG. 14 is a front view of another embodiment of an exemplary arrangement of fastening members of a steering wheel cover, in accordance with the principles of the present invention.
Figure 15:
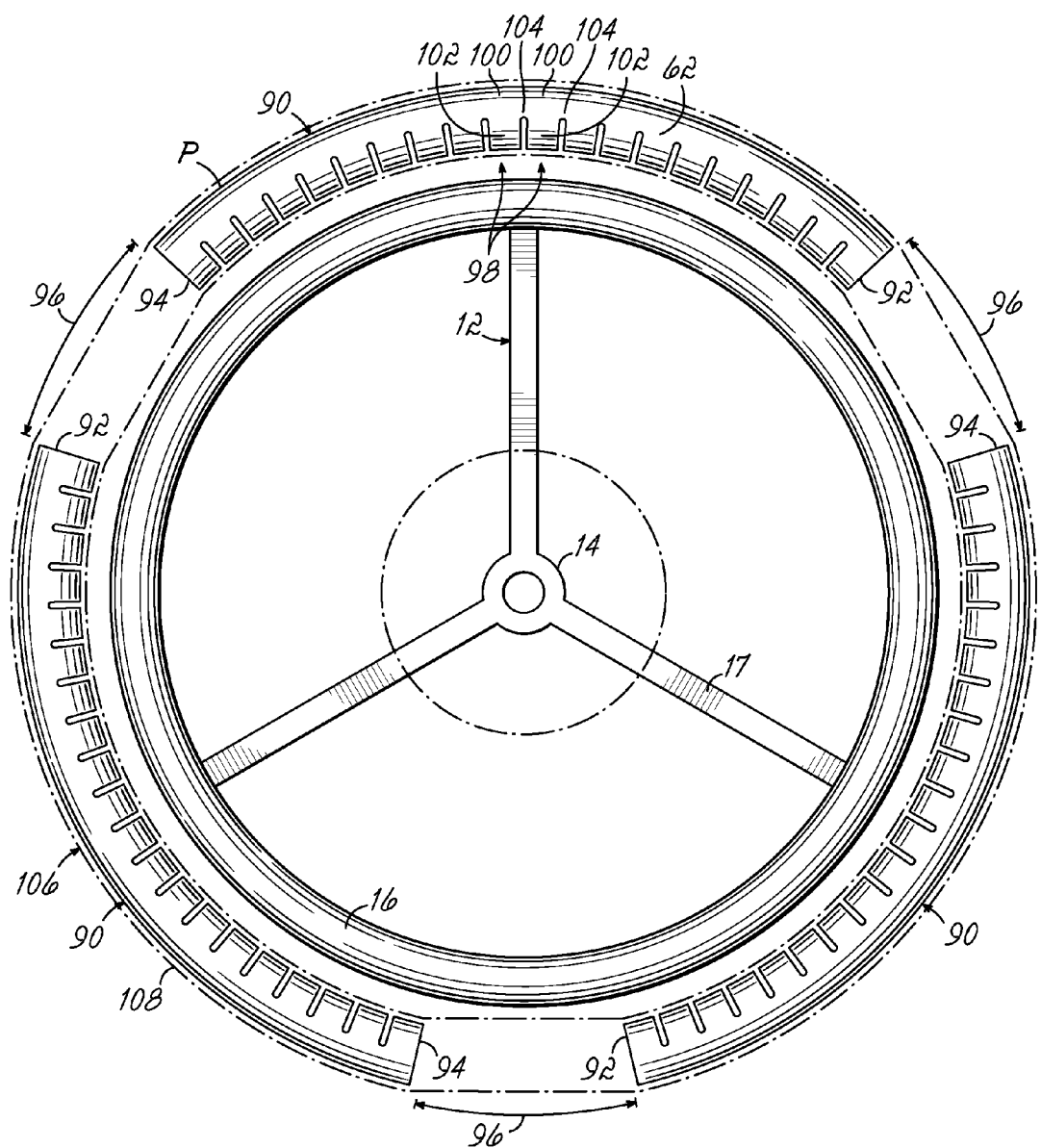
FIG. 15 is a front view of an exemplary steering wheel cover including the fastening members of FIG. 14, illustrating installation over a steering wheel.
Figure 16:
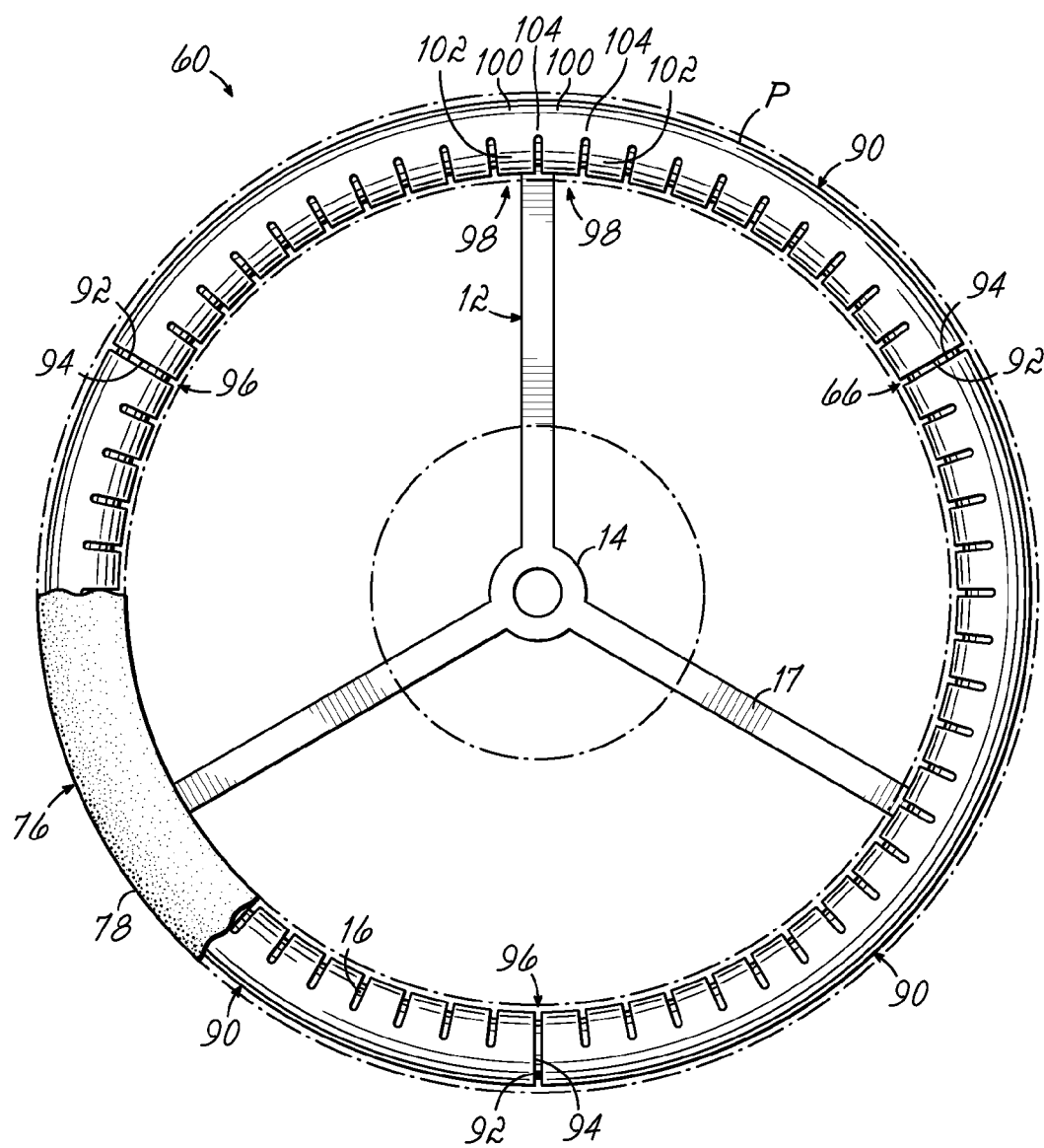
FIG. 16 is a front view of the exemplary steering wheel cover of FIG. 15, installed over a steering wheel.

Referring now to FIGS. 14-19, another exemplary embodiment of a steering wheel cover in accordance with the principles of the present invention may include a plurality of fastening members 90 similar to fastening member 60 previously described with reference to FIGS. 9-13. With specific reference to FIG. 14, the fastening members 90 may be constructed of a semi-flexible or semi-resilient material, such as a polymer, for example, and may each include respective first and second terminal ends 92, 94 arranged to define gaps 96 that accommodate differently sized steering wheels in an installed condition (FIG. 16). In one embodiment, the first and second terminal ends 92, 94 of each fastening member 90 may be elastically coupled to terminal ends of adjacent fastening members, in order to bias the terminal ends of adjacent fastening members toward each other. For example, the terminal ends 92, 94 of the fastening members 90 may be coupled to one another by means of an elastic band (not shown).

The fastening members 90 may each include a plurality of integrally formed clips 98, each having a clip base portion 100 and first and second oppositely disposed arms 102, 103. The first and second oppositely disposed arms 102, 103 may comprise a semi-flexible or semi-resilient material in order to provide a snap-fit over the rim of a steering wheel. For example, the first and second oppositely disposed arms 102, 103 may comprise a polymeric material. It will be appreciated, however, that various other materials may be used that are suitable for facilitating securing the fastening members 90 to a rim of a steering wheel. Moreover, the fastening members 90 may further include spacer portions 104 positioned between adjacent clips 98 in order to provide a spaced apart relationship between the clips 98 and to define an outer periphery P. For example, the clips 98 may be spaced apart to define a circular periphery P, as shown, and which may generally correspond to a steering wheel rim.

With specific reference now to FIGS. 15 and 16, a steering wheel cover 106 including a cover material 108 and the fastening members 90 depicted in FIG. 14 may be manipulated by a user in order to position the steering wheel cover 106 over a steering wheel rim 16. For example, the fastening members 90 may be manipulated away from each other. As the fastening members 90 move away from each other, the cover material 108 may be stretched freely and the gaps 96 may expand such that the outer periphery P may be partially expanded. The steering wheel cover 106 may then be positioned around the rim 16 of the steering wheel 12 (FIG. 15). Subsequently, as the fastening members 90 retract toward each other, the cover material 108 and the gaps 96 may contract such that the outer periphery P contracts until the clips 98 are received over, and engage, the rim 16 (FIG. 16). In one embodiment, the fastening members 90 may be coupled together by the cover material 108. Moreover, the cover material 108 may comprise an elastic material, such that the cover material 108 may facilitate the retraction of the fastening members 90 toward each other. Alternatively, a cover material 108 may not be disposed around the fastening members 90, or may be partially disposed over the fastening members 90 such that the cover material 108 may not interfere with, or otherwise substantially affect, the manipulation of the fastening members 90.

Figure 19:
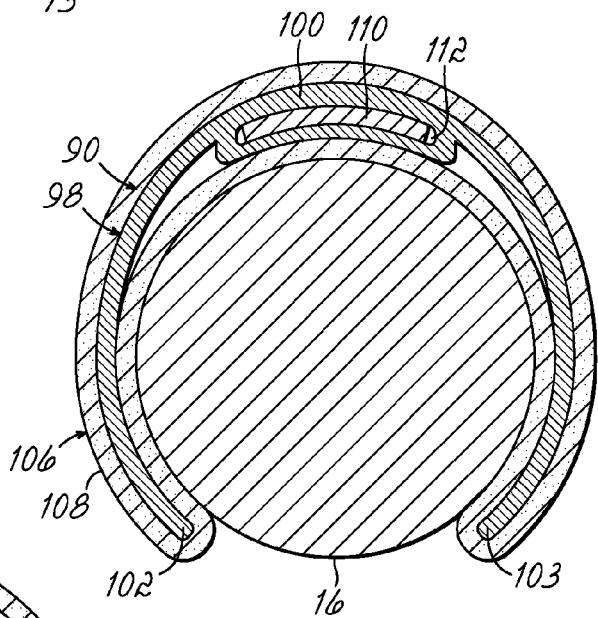
FIG. 19 is a cross-sectional view of the exemplary steering wheel cover of FIG. 18, taken along section line 19-19.
Figure 17:
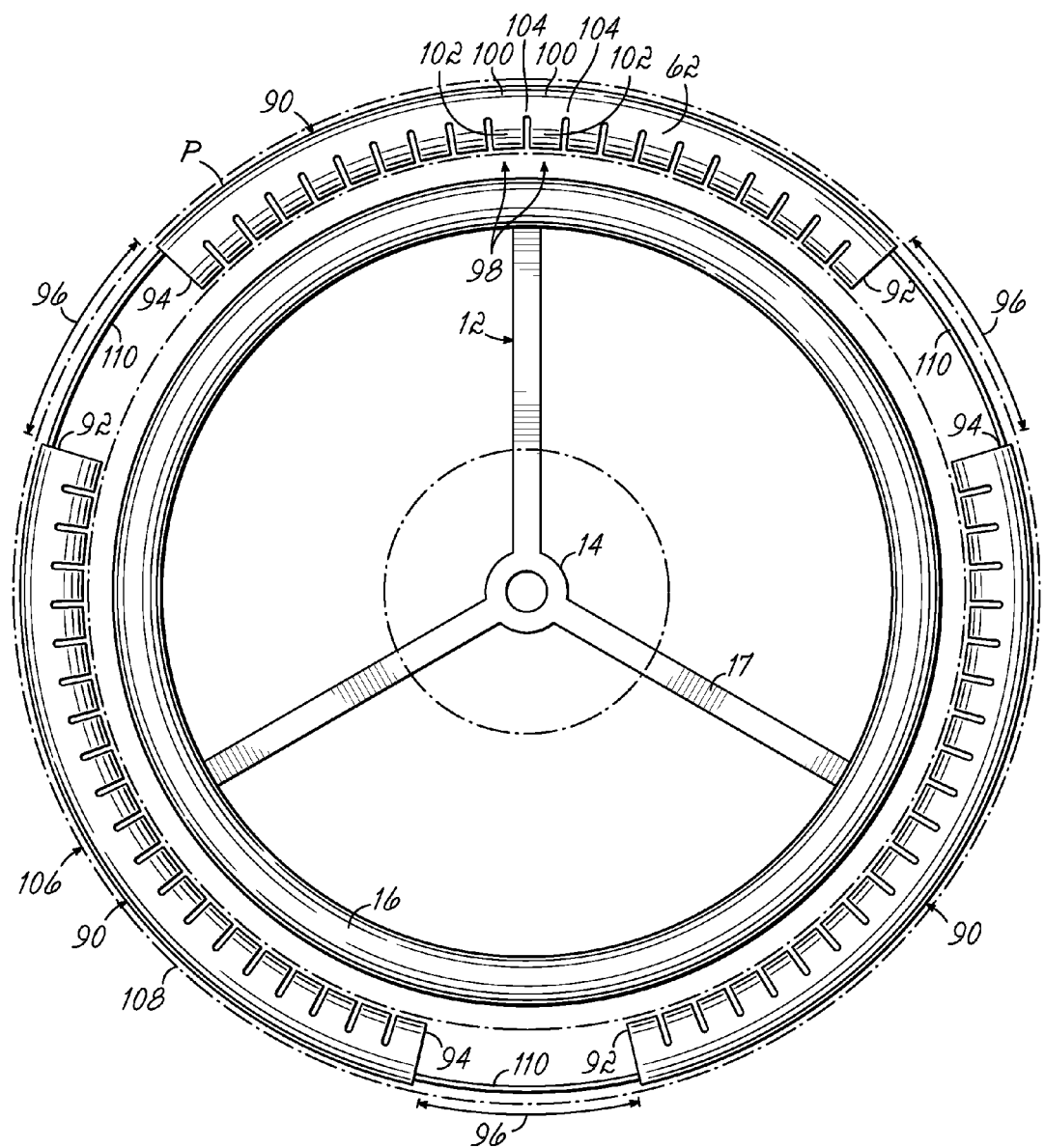
FIG. 17 is a front view of another embodiment of an exemplary steering wheel cover in accordance with the principles of the present invention, illustrating installation over a steering wheel.
Figure 18:
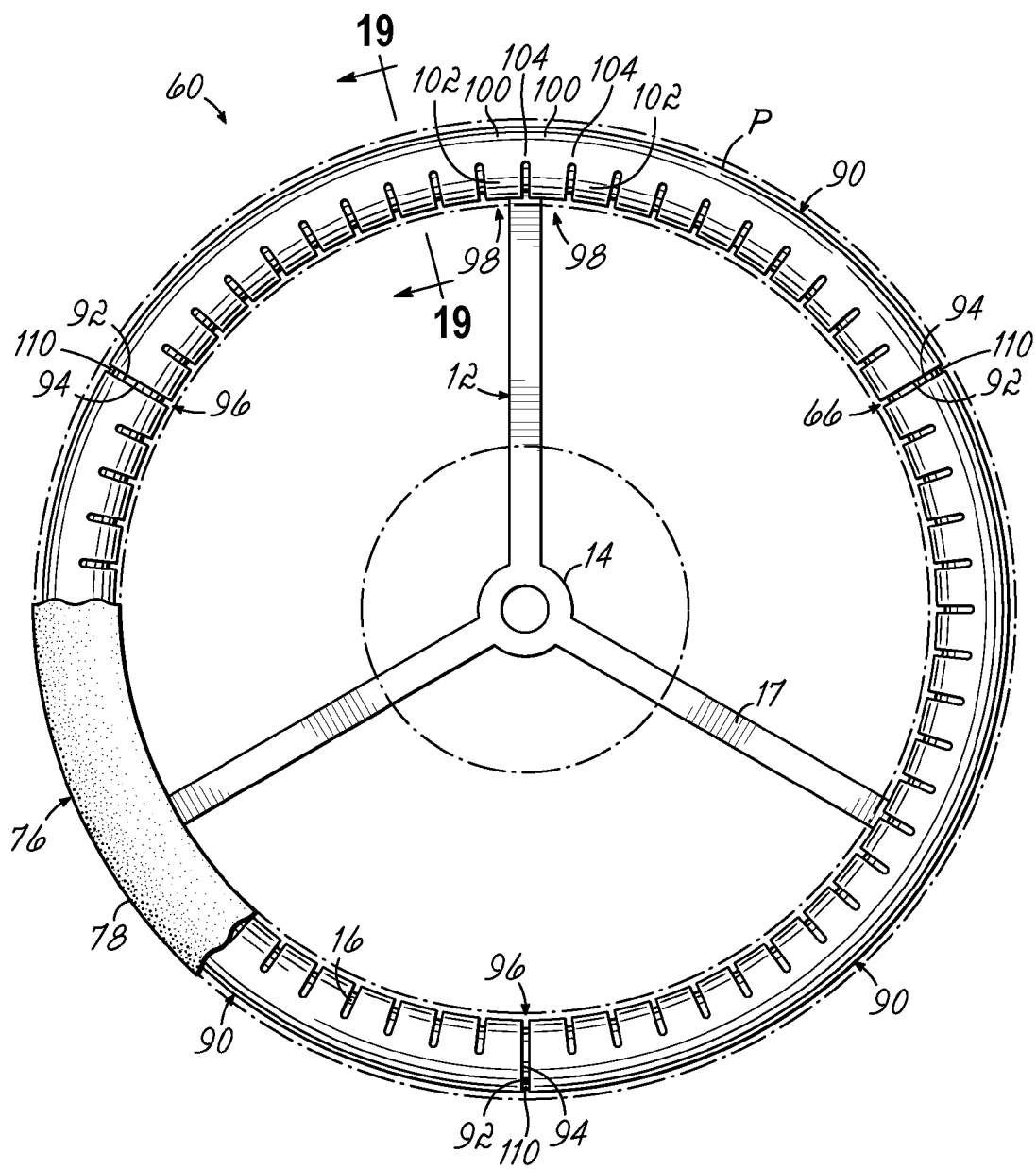
FIG. 18 is a front view of the exemplary steering wheel cover of FIG. 17, installed over a steering wheel.

Referring now to FIGS. 17-19, and with continued reference to FIGS. 14-16, in another alternative embodiment, the fastening members 90 may be slideably coupled with one another. For example, each fastening member 90 may include a curved rail 110 and an aperture 112 (FIG. 19), such that the curved rail 110 of one fastening member 90 may be received within the corresponding aperture 112 of an adjacent fastening member 90, as shown in FIG. 19. In this manner, the fastening members 90 may slide relative to one another in a telescoping manner while maintaining a substantially circular outer periphery P, and while also maintaining the circular appearance of the steering wheel cover 106. For example, as the fastening members 90 are manipulated away from each other, the rails 110 are partially withdrawn from the corresponding apertures 112, the cover material 108 may be stretched and the gaps 96 may expand such that the outer periphery P may also expand. The steering wheel cover 106 may then be positioned around the rim 16 of the steering wheel 12 (FIG. 17). Subsequently, as the fastening members 90 are retracted toward each other, the rails 110 are extended through the corresponding apertures 112, and the cover material 108 and the gaps 96 contract such that the outer periphery P contracts until the clips 98 are received over, and engage, the rim 16 (FIG. 18).

Figure 23:
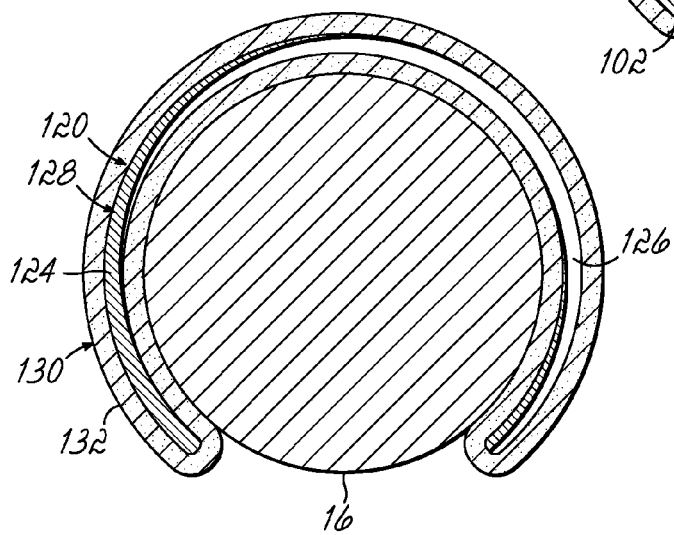
FIG. 23 is a cross-sectional view of the exemplary steering wheel cover of FIG. 22, taken along section line 23-23.

Referring now to FIGS. 20-23, in another exemplary embodiment, a fastening member 120 for a steering wheel cover in accordance with the principles of the present invention is shown. The fastening member 120 may comprise a generally annular shape, and may include at least one corrugated tube 122 having a plurality of substantially parallel ridges 124 and furrows 126. In the embodiment shown, the fastening member 120 includes a corrugated tube 122 having a helical, or spiral, configuration, wherein the plurality of ridges and furrows 124, 126 may be provided by a coil 128 with a substantially constant pitch provided along the length of the tube 122. However, in another embodiment, the fastening member 120 may include a corrugated tube having a circumferential, or annular, configuration, including, for example, a plurality of substantially equally-spaced corrugations whose main plane is substantially perpendicular to the tube's axis. The fastening member 120 may further include an opening 129 extending along the corrugated tube 122 such that the corrugated tube 122 may be received over a steering wheel rim, as best shown in FIG. 23. The corrugated tube 122 may comprise a semi-flexible or semi-resilient material in order to provide a snap-fit over the rim of a steering wheel. For example, the corrugated tube 122 may comprise a plastic material. However, various other materials may be used that are suitable for facilitating securing the fastening member 120 to a rim of a steering wheel.

Figure 20:
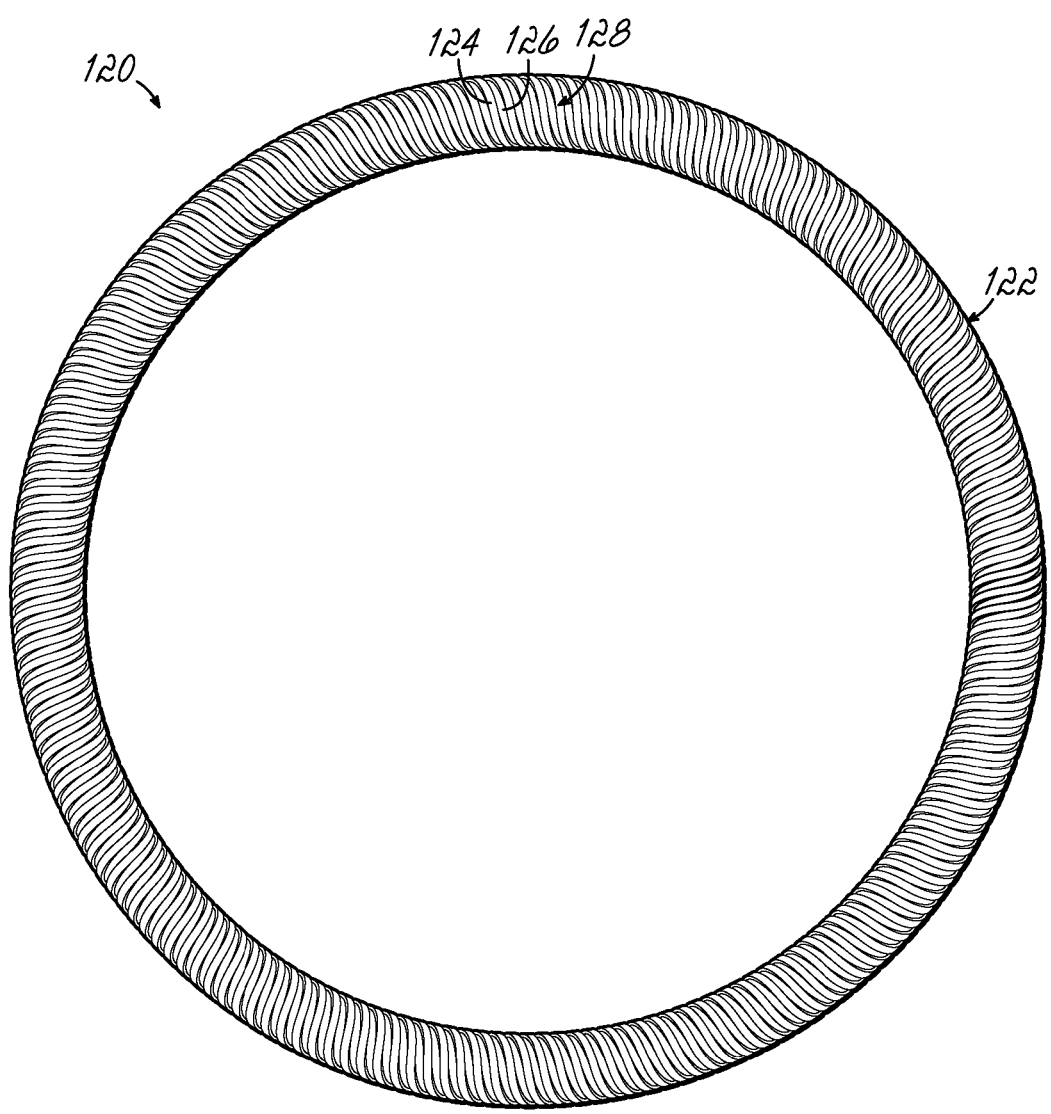
FIG. 20 is a front view of another embodiment of an exemplary fastening member of a steering wheel cover in accordance with the principles of the present invention.
Figure 21:
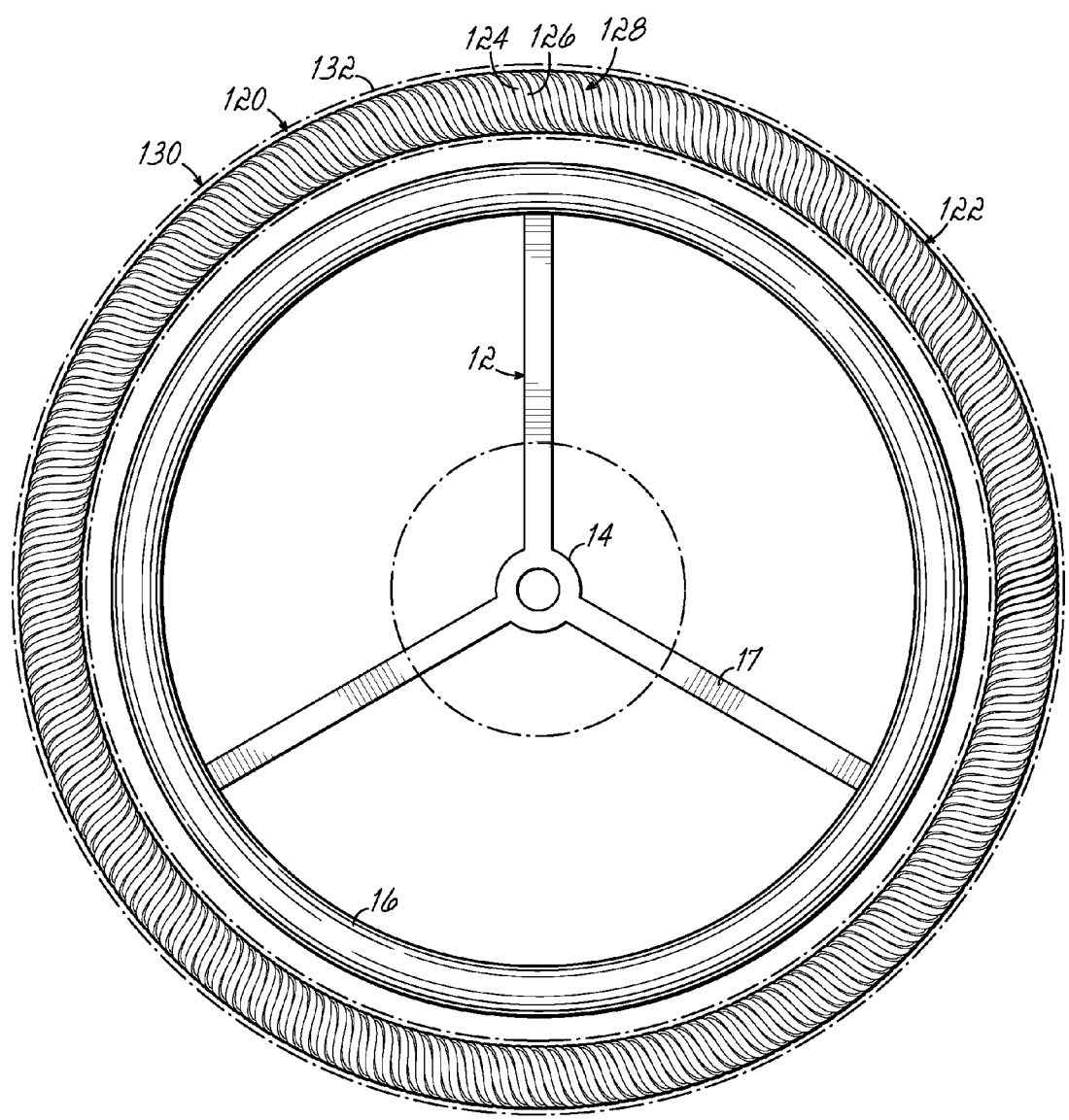
FIG. 21 is a front view of an exemplary steering wheel cover including the fastening member of FIG. 20, illustrating installation over a steering wheel.
Figure 22:
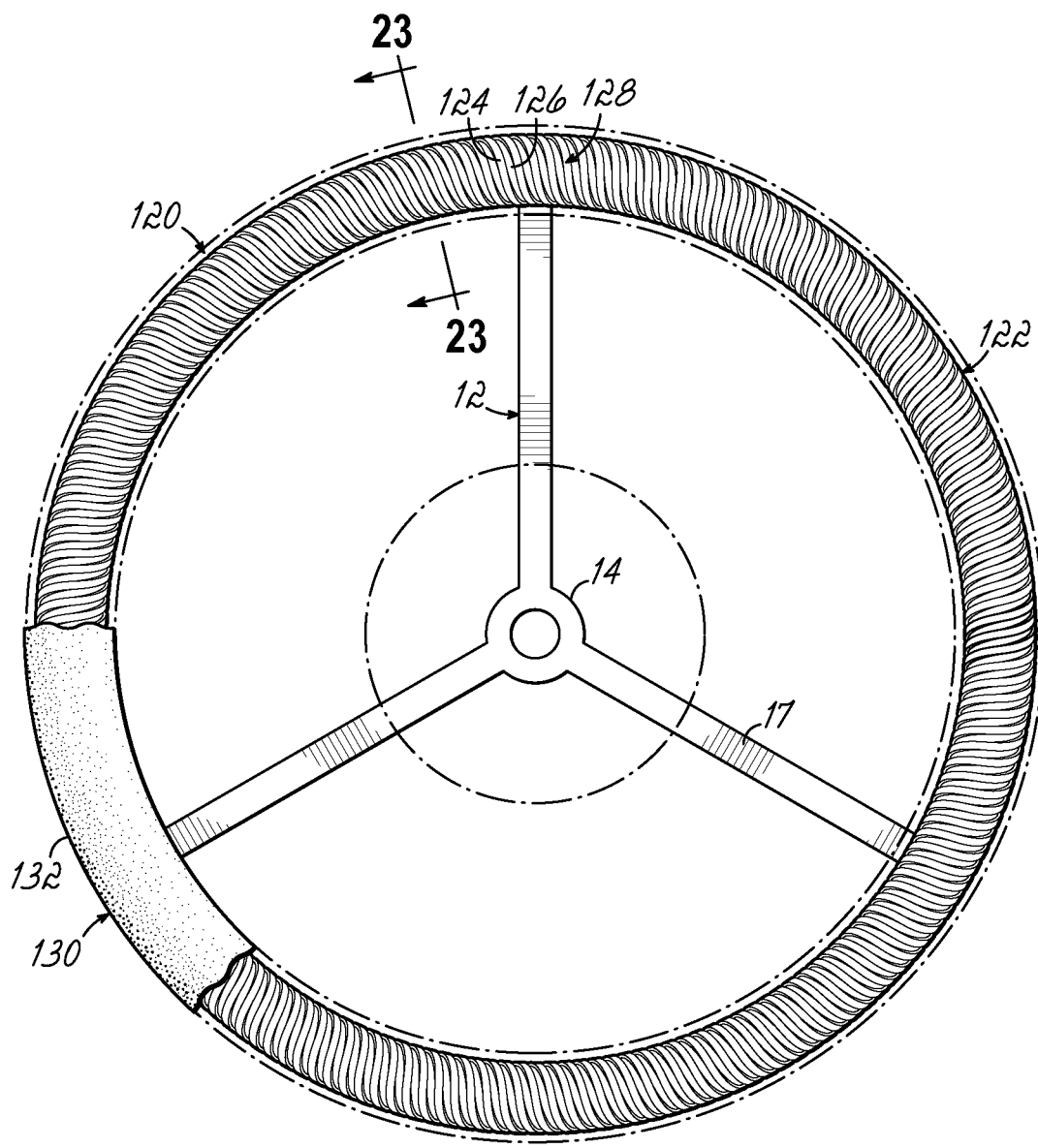
FIG. 22 is a front view of the exemplary steering wheel cover of FIG. 21, installed over a steering wheel.

With specific reference now to FIGS. 21 and 22, a steering wheel cover 130 including a cover material 132 and the fastening member 120 depicted in FIG. 20 may be manipulated by a user in order to fit the steering wheel cover 130 over a steering wheel rim 16. For example, the fastening member 120 may be stretched outwardly in a radial direction. As the fastening member 120 is stretched, the cover material 132 may also be stretched. The steering wheel cover 130 may then be positioned around the rim 16 of the steering wheel 12 (FIG. 21). Subsequently, as the fastening member 120 retracts, the cover material 132 also retracts until the corrugated tube 122 is received over, and engages, the rim 16 (FIG. 22).

Figure 24:
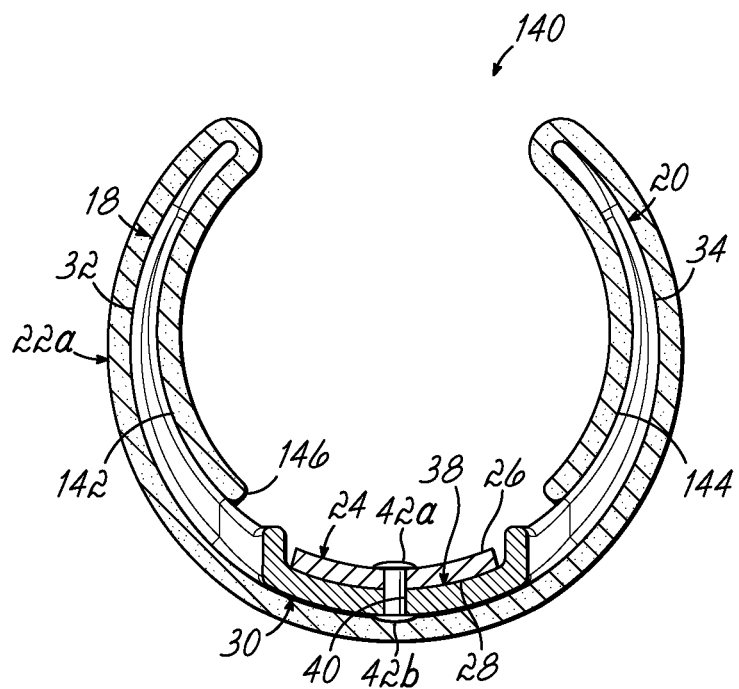
FIG. 24 is a cross-sectional view, similar to FIG. 8, illustrating another exemplary embodiment of a steering wheel cover in accordance with the principles of the present invention.
Figure 25:
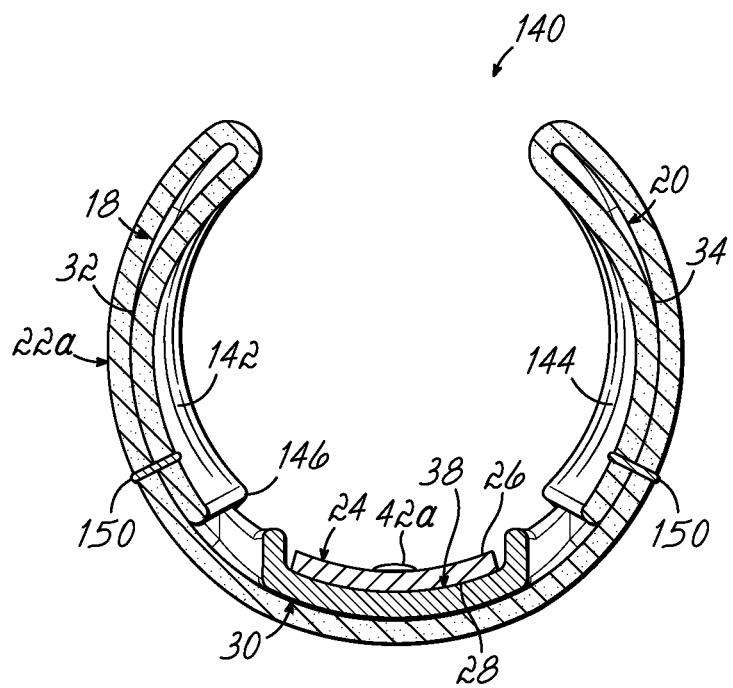
FIG. 25 is a cross-sectional view similar to FIG. 24, but taken through a section spaced from the rivets illustrated in FIG. 24.

FIGS. 24 and 25 illustrate another exemplary embodiment of a steering wheel cover 140 in accordance with the principles of the present invention, and FIG. 24 depicts cross-sectional views similar to FIG. 8. FIG. 25 depicts a cross-sectional view similar to FIG. 24, but wherein the section is taken a distance spaced from rivets 42a, 42b. The steering wheel cover 140 is similar to the steering wheel cover 10 shown and described with respect to FIGS. 1-8, and similar features are similarly numbered. In this embodiment, the steering wheel cover 140 includes a cover material 22a that is mechanically coupled with the fastening members 18 so that the cover material 22a is selectively removable therefrom. In this embodiment, the cover material 22a includes a plurality of pockets 142, 144, wherein the arms 32, 34 of at least some of the clips 20 are received in the pockets 142, 144. In this way, the cover material 22a may be disposed around the fastening members 18 such that the arms 32, 34 of at least some of the clips 20 may be retained within respective pockets 142, 144 in order to mechanically couple the cover material 22a to the clips 20. For example, each pocket 142, 144 may be provided by folding an edge portion 146 of the cover material over an arm 32, 34 of a clip 20 and attaching the cover material 22a to itself adjacent each side of the arm, for example, by stitching 150. While stitching 150 has been shown and described herein, it will be appreciated that various other methods of attaching the cover material 22a to itself may used, such as gluing, stapling, tacking, fusing, or any other suitable method of attaching the cover material 22a to itself to form a pocket 142, 144. In this manner the retention of the arms 32, 34 within the pockets 142, 144 may reduce bunching of the cover material 22a. Moreover, the cover material 22a may be easily removed from the fastening members by withdrawing the arms 32, 34 of the clips 20 from their respective pockets 142, 144.

While cover material 22a having pockets 142, 144 has been shown and described herein as receiving arms 32, 34 of at least some of the clips 20 of faster members 18, it will be appreciated that other embodiments may include cover members having pockets for receiving the arms of other types of fastening members shown and described herein. Moreover, while cover material 22a has been shown and described herein as being mechanically coupled with fastening members 18 so that the cover material 22a is selectively removable from arms 32, 34, a cover material in accordance with yet another embodiment of the present invention may be attached directly to the arms 32, 34 of at least some of the clips 20, such as by stitching or otherwise securing the cover material thereto, so that the cover material is not removable.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. Various features shown and described herein may be used individually or in any combination. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A selectively removable cover for a steering wheel having a rim and a hub, the cover comprising:
    at least one fastening member including a plurality of resilient and generally C-shaped clips spaced apart to define an outer periphery, wherein the clips each include a base portion and first and second oppositely disposed arms, wherein the clips are configured to be received over the rim of the steering wheel, and wherein the first and second arms are spaced apart from each other when the clips are received over the rim; and
    a band, wherein the at least one fastening member is coupled to the band.

2. The selectively removable cover of claim 1, wherein the band defines a generally annular shape.

3. The selectively removable cover of claim 1, wherein the band includes a radially inwardly facing surface and a radially outwardly facing surface, and wherein the at least one fastening member is attached to at least one of the radially inwardly facing surface or the radially outwardly facing surface.

4. The selectively removable cover of claim 1, further comprising at least one spacer portion positioned among the clips such that the at least one spacer portion defines a portion of the outer periphery.

5. The selectively removable cover of claim 4, wherein the at least one spacer portion is integrally formed with the at least one fastening member.

6. The selectively removable cover of claim 1, wherein the band is constructed of an elastomeric material.

7. The selectively removable cover of claim 1, further comprising at least one cover material disposed around the at least one fastening member.

8. The selectively removable cover of claim 7, wherein the cover material includes a plurality of pockets, and wherein the arms of the clips are retained within respective pockets.

9. The selectively removable cover of claim 7, wherein the cover material maintains a spacing between the clips.

10. The selectively removable cover of claim 1, wherein the at least one fastening member is integrally formed with the band.

11. The selectively removable cover of claim 1, wherein the at least one fastening member includes a plurality of fastening members generally evenly spaced apart along the outer periphery.

12. The selectively removable cover of claim 11, wherein the plurality of fastening members are operable to slide relative to one another.

13. The selectively removable cover of claim 12, wherein the plurality of fastening members are elastically coupled to one another.

14. The selectively removable cover of claim 1, wherein the band defines a generally linear shape.

15. A selectively removable cover for a steering wheel having a rim and a hub, the cover comprising:
    at least one fastening member including a plurality of resilient and generally C-shaped clips spaced apart to define an outer periphery, wherein the clips each include a base portion and first and second oppositely disposed arms, and wherein the clips are configured to be received over the rim of the steering wheel; and
    a band, wherein the at least one fastening member is coupled to the band, wherein the at least one fastening member includes an aperture and wherein the band is positioned within the aperture for mechanically coupling the at least one fastening member to the band.

16. A selectively removable cover for a steering wheel having a rim and a hub, the cover comprising:
    at least one fastening member including a plurality of resilient and generally C-shaped clips spaced apart to define an outer periphery, wherein the clips each include a base portion and first and second oppositely disposed arms, and wherein the clips are configured to be received over the rim of the steering wheel; and
    a band, wherein the at least one fastening member is coupled to the band, wherein the at least one fastening member defines a channel, and wherein the band is positioned within the channel.

17. A selectively removable cover for a steering wheel having a rim and a hub, the cover comprising:
    at least one fastening member coupled to a band, the fastening member including a plurality of resilient and generally C-shaped clips spaced apart to define an outer periphery, wherein the clips each include a base portion and first and second oppositely disposed arms, and wherein the clips are configured to be received over the rim of the steering wheel and to provide a snap-fit over the rim of the steering wheel.

18. The selectively removable cover of claim 17, wherein the at least one fastening member includes at least first and second fastening members spaced apart to define at least a portion of a circumferential periphery of the cover; and
    wherein the spacing between the first and second fastening members increases to thereby expand the cover in a radial direction of the cover and facilitate fitting the cover over the rim of the steering wheel.

* * * * *